(12) United States Patent
Struijs

(10) Patent No.: US 7,239,990 B2
(45) Date of Patent: Jul. 3, 2007

(54) METHOD FOR THE NUMERICAL SIMULATION OF A PHYSICAL PHENOMENON WITH A PREFERENTIAL DIRECTION

(76) Inventor: Robert Struijs, 28 Avenue de Gascogne, Tournefeuille (FR) 31170

( * ) Notice: Subject to any disclaimer, the term of this patent is extended or adjusted under 35 U.S.C. 154(b) by 453 days.

(21) Appl. No.: 10/779,685

(22) Filed: Feb. 18, 2004

(65) Prior Publication Data

US 2004/0167757 A1 Aug. 26, 2004

Related U.S. Application Data

(60) Provisional application No. 60/498,351, filed on Aug. 28, 2003, provisional application No. 60/448,108, filed on Feb. 20, 2003.

(51) Int. Cl.
 *G06F 17/10* (2006.01)
(52) U.S. Cl. .............................. 703/2; 703/9
(58) Field of Classification Search .................... 703/2, 703/9; 345/473
 See application file for complete search history.

(56) References Cited

U.S. PATENT DOCUMENTS

| 5,680,590 | A | * | 10/1997 | Parti | .............................. | 703/2 |
| 5,801,969 | A | * | 9/1998 | Nagahama | ...................... | 703/9 |
| 6,266,071 | B1 | * | 7/2001 | Stam et al. | .................. | 345/473 |

OTHER PUBLICATIONS

Wapperom et al., P. Simulation for Viscoelastic Flow by a Finite Volume/Element Method, Computer Methods in Applied Mechanics and Engineering, vol. 180, Dec. 1999, pp. 281-304.*

Wapperom et al., P. A Second-Order Hybrid Finite-Element/Volume Method for Viscoelastic Flows, Journal of Non-Newtonian Fluid Mechanics, vol. 79, Nov. 1998, pp. 405-431.*

Malcevic et al., I. Dynamic-Mesh Finite Element Method for Lagrangian Computational Fluid Dynamics, Finite Elements in Analysis and Design, vol. 38, Aug. 2002, pp. 965-982.*

Aliabadi et al., S. Parallel Simulation of Two-Phase Flow Problems Using the Finite Element Method, The Seventh Symposium on the Frontiers of Massively Parallel Computation, Feb. 1999, pp. 113-120.*

Quarteroni et al., A. Computational Fluid Dynamics at CRS4, Italy, IEEE Computational Science and Engineering, vol. 3, Fall 1996, pp. 4-8.*

Hansen et al., R.P. A Comparison of Structured and Unstructured Grid Solutions for Flow Over a Circular Cylinder, IEEE, User Group Conference, 2003, pp. 104-112.*

(Continued)

*Primary Examiner*—Russell Frejd
(74) *Attorney, Agent, or Firm*—Young & Thompson

(57) ABSTRACT

The invention provides a method of simulating behavior of a flow interacting with an object. The invention improves the accuracy of the approximation of the spatial $p^{th}$ derivative $D_p$, $p \geq 1$, and therefore reduces the cost of the simulation. It includes in the approximation values of the parameter at points which do not lay on grid lines passing through the point of computation P, and by using these values to optimize the approximation. The use of these additional points depends on a preferential direction, such as determined by the advection direction of the flow. The points used in the approximation extend beyond a unit cube on the computational grid. The simulation is in three or more dimensions. The numerical simulation produces output which can be used in the design or optimization of the object which interacts with the flow. In certain cases, it is the output by itself which is important.

52 Claims, 10 Drawing Sheets

OTHER PUBLICATIONS

Pagendarm et al., H.-G. Feature Detection from Vector Quantities in a Numerically Simulated Hypersonic Flow Field in Experimental Flow Visualization, IEEE Conference on Visualization, Oct. 1994, pp. 117-123.*

Charles Hirsch, "Numerical Computation of Internal and External Flows", vol. 1: Fundamentals of Numerical Discretization, Department of Fluid Mechanics, Vrije Universiteit Brussel, Brussels, Belgium, Published in 1988 by John Wiley and Sons.

Bram van Leer, "ICASE- Progress in Multi-Dimensional Upwind Differencing", ICASE Report No. 92-43, Contract Nos. NASI-18605 and NASI-19480 Sep. 1992, Institute for Computer Applications in Science and Engineering NASA Langley Research Center, Hampton, Virginia 23665-5225.

P.L. Roe et al., Siam Journal on Numerical Analysis, "Optimum Positive Linear Schemes for Advection in Two and Three Dimensions", vol. 29, No. 6, pp. 1542-1568, Dec. 1992.

David Paul Hills, Numerical Aerodynamics: Past Successes and Furture Challenges From an Industrial Point of View, 1996, D.P. Hills, Computational Methods in Applied Sciences '96, Published in 1996 by John Wiley & Sons.

Murray R. Spiegel, "Mathmatical Handbook of Formulas and Tables", Including 2400 Formulas and 60 Tables, Schaum's Outline Series, Rensselaer Polytechnic Institute, Sep. 1968.

Peter Lax et al., New York University and Los Alamos Scientific Laboratory, "System of Conservation Laws", Communication on Pure and Applied Mathmatics, vol. XIII, 217-237 (1960).

* cited by examiner

METHOD FOR THE NUMERICAL SIMULATION OF A PHYSICAL PHENOMENON WITH A PREFERENTIAL DIRECTION

REFERENCE TO COMPUTER PROGRAM LISTINGS

A computer program listing appendix with twelve files is provided on a compact disc as part of the invention disclosure. The material of the twelve files on the compact disc is incorporated by reference. The files included on the compact disc are:

generate-discretization.mu has a size of 6,241 bytes and was created (stored on the CD-R) on Dec. 12, 2006.

This file contains the program "generate-discretization", referred to as Appendix 1.

preparations.mu has a size of 3,101 bytes and was created (stored on the CD-R) on Dec. 12, 2006. This file contains the subroutine "preparations", referred to as Appendix 2.

setup-equations.mu has a size of 17,414 bytes and was created (stored on the CD-R) on Dec. 12, 2006.

This file contains the subroutine "setup-equations", referred to as Appendix 3.

solve-equations.mu has a size of 4,681 bytes and was created (stored on the CD-R) on Dec. 12, 2006. This file contains the subroutine "solve-equations", referred to as Appendix 4.

analyze-solution.mu has a size of 22,654 bytes and was created (stored on the CD-R) on Dec. 12, 2006. This file contains the subroutine "analyze-solution", referred to as Appendix 5.

appendix6.txt has a size of 10,588 bytes and was created (stored on the CD-R) on Dec. 12, 2006. This file contains the output for D100, Order 2, on the grid $(-1,1)^3$, optimize=0, referred to as Appendix 6.

appendix7.txt has a size of 3,289 bytes and was created (stored on the CD-R) on Dec. 12, 2006. This file contains the output for D100, Order 2, on the grid $(-1,1)^3$, optimize=1, referred to as Appendix 7 appendix8.txt has a size of 9,465 bytes and was created (stored on the CD-R) on Dec. 12, 2006. This file contains the output for D100, Order 2, on the grid $(-1,1)^3$, optimize=1, referred to in the following as Appendix 8.

appendix9.txt has a size of 47,206 bytes and was created (stored on the CD-R) on Dec. 12, 2006. This file contains the output for D100, Order 4, on the grid $(-2,2)^3$, optimize=0, 30, referred to as Appendix 9.

appendix10.txt has a size of 4,092 bytes and was created (stored on the CD-R) on Dec. 12, 2006. This file contains the output for D100, Order 4, on the grid $(-2,2)^3$, optimize=1, referred to as Appendix 10.

appendix11.txt has a size of 49,617 bytes and was created (stored on the CD-R) on Dec. 12, 2006. This file contains the output for D100, Order 4, on the grid $(-2,2)^3$, optimize=2, 5, referred to as Appendix 11.

appendix12.txt has a size of 16,572 bytes and was created (stored on the CD-R) on Dec. 12, 2006. This file contains the output for D200, Order 2, on the grid $(-1,1)^3$, optimize=0, referred to as Appendix 12.

The invention concerns a method of simulating behavior of a flow interacting with an object, the method providing a simulated numerical representation in N dimensions, $N \geq 3$, that is composed of a plurality of approximated values at a multitude of points in at least a part of space where the flow interacts with the object, the approximated values being of a physical parameter u of the flow to which is associated a velocity field $\vec{a}$ which determines a preferential direction, by means of a numerical scheme wherein at least one spatial $p^{th}$ derivative $D_p$, $p \geq 1$, of the physical parameter u is approximated at the points of the part of space.

The numerical simulation of physical parameters related to a velocity field is instrumental in many practical applications for the conception, optimization and dimensioning of various appliances and commercial products, related to internal or external flow. Numerical simulations have become a valuable alternative to or complement of physical experiments such as performed in e.g. a wind tunnel or a towing tank.

As an example, numerical codes in the field of fluid dynamics can compute the flow for the conception of aircraft, cars, ships, turbines, ventilation and so on. Numerical simulations can also be used for the modeling of multi-phase flow as encountered in oil recovery or in combustion; or in various electromagnetic applications; or multi-physics flow like magneto-hydrodynamics; or in meteorological phenomena like weather prediction; or biological flow in arteries, the heart or the lungs; or forest fire simulation; or shallow water simulation for river and channel flow and so on.

It should be noted in this regard that for certain applications, the numerical simulation is the only feasible way to obtain practical information about the behavior of objects interacting with flow. These applications are characterized by extreme difficulties in, or the impossibility of performing physical measurements, or the practical use of them. This is in particular the case in weather prediction, hypersonic flow or combustion. Numerical simulations are in any case a valuable complement to traditional measurements when the measurements are available. Numerical simulations are currently widely used to reduce the cost and time of the design-cycle of commercial products.

BACKGROUND OF THE INVENTION

The numerical simulation of physical phenomena is well known, and numerical solutions obtained from computer codes are used in many domains of industry. In the following example, we will recapitulate the steps which enter into the daily routine of the application of numerical simulations. The domain of application of the example is Computational Fluid Dynamics (CFD), but the methodology applies equally to other domains and applications. Consider a company which makes aircraft, and who wishes to design or to optimize a wing for the lift to drag ratio. The design department decides to use the tool of numerical simulations since wind tunnel tests are expensive. Their CFD department responds to this request in the following way.

1. A decision is made on which part of physics is important to describe in enough detail the phenomena in a meaningful simulation. In many fluid dynamics cases, the basic fluid dynamics equations like the Navier-Stokes equations are adequate. Perhaps a more simple description can be used. If viscous effects are less important, the Euler equations can be used. At low Mach number, an incompressible approximation can be used. Maybe the potential flow approximation is sufficient. On the other hand, a turbulence model may be needed, together with acoustic models, and a description of the deflection of the wing under aerodynamic forces.

The physical description is expressed in a mathematical model comprising of one or more equations which describe the relations between the physically relevant parameters (mass, density, energy, forces, impulse, pressure, volume, temperature, species concentration, charge density, magnetic field, . . . ). In general, the mathematical model uses spatial derivatives of one or more of the parameters, as well as time derivatives. Together with the number of space dimensions, the physical model determines the number of variables which are needed in the solution. In the case of the Navier-Stokes equations in three dimensions, five variables which depend on space and time describe the physical solution. These five variables can be e.g. the density, the momentum in the three directions and the energy. This set of variables is commonly known as conservative variables. Other combinations are possible, such as the density, the three velocity components and the pressure, which is known as the set of primitive variables. Yet another set of variables is known as entropy variables, since one of the variables is chosen to be proportional to the entropy. A transformation is always possible between different sets of independent variables.

2. The next step is to choose a computer program which can compute a solution to the problem which is compatible with the physical description of the problem. The simulation code will be run on a computer. While the physics and the mathematical model describe a continuum, the computer can only work with discrete values in a limited number of points. The solution of the mathematical model with a computer program therefore involves the procedure of discretization, which consists of two steps.

First, the continuous variable is replaced by a discrete variable in space. A grid defines points in space where the values of the parameters are stored.

The second step is to rewrite the relations between the continuous variables of the mathematical model in relations between discrete variables. In particular, the derivatives which appear in the mathematical model are replaced by their discrete equivalent, which are differences which are locally calculated using the values of the discrete variables of the surrounding grid points. This step involves an approximation and is not exact.

In general, a big enough company has the means and experience to develop and maintain an in-house computer code. Such a code is tuned to the specific needs of the company. It may compute solutions to only a very restricted number of physical problems, but it is likely to be up to date. The developments in the domain are followed, and e.g. new space discretizations, faster solution techniques such as accelerators and so on are coded. After testing, the code is ready for production runs. Smaller enterprises often can afford only a small CFD group, which uses programs from a specialized provider. This is normally a more general code, since it will have to accommodate a larger spectrum of clients with different applications.

3. The computation of the numerical solution is preceded by a pre-processing step. A geometrical description of the wing is used to generate a computational grid. This grid defines the points in space where the solution is calculated. Together with this grid an initial solution is generated. In the case of the Navier-Stokes equations, the five independent variables are given a certain value for each of the grid points, corresponding to e.g. uniform flow at the design Mach number. The grid and the initial solution are written to one or more files.

4. The next step is to run the simulation code. The program performs the following actions:
  a) The program reads the grid, and stores for each point the coordinates in the memory of the computer.
  b) It reads the initial solution and stores for each grid point the value of the physical parameters in memory.
  c) Additional files are read which specify computational parameters such as the number of iterations or a convergence criterion, which physical model to use, which of the coded space discretizations to use, and additional information if necessary. Boundary conditions are specified which are used at the extremities of the part of space under consideration. They represent inflow and outflow from the domain, the way the wing influences the flow, and any other interaction of the flow with its surroundings.
  d) Using the grid, the initial solution and the boundary conditions, it solves iteratively and approximately the discrete mathematical equations which describe the physical problem.
  e) The code stops after a specified number of iterations, or when a solution is obtained which is accurate enough.
  f) The code writes the solution to a file. This output solution consists of the value of physical variables in each of the grid points, where the number of physical variables corresponds to the problem. Another output file may be written which contains the grid.

5. A post-processing program is used to read the grid file and the output file of step 4f. Normally this very general program permits to extract any desired physical parameter which can be computed from the solution. If the solution is written in the form of conservative variables, this program can compute the pressure, which is needed for the lift and drag. It can also compute variables like the Mach number, the temperature and so on.

6. The results are used to modify or improve the geometry.

Steps 3-6 are repeated until the design is optimal. In the case of insufficiency of the physical model, a more elaborate one is chosen, and coded if necessary. If there is insufficient resolution of the simulated physical phenomena on parts of the grid, a finer grid is generated.

The above describes the typical computation of a numerical solution and its use in an industrial environment. A similar procedure is followed when the purpose is to design or to optimize part of a car, a ship, a vehicle in general, a turbo machine, a ventilation system, a wind mill, a pump, a combustion engine, a channel, the mixture of steam and oil or water and oil in porous media for oil recovery, and so on, or to describe the evolution of flow such as in weather prediction, climate modeling or in a forest fire. In step 1, the physical model depends on the problem under consideration. In a magneto-hydrodynamics application, the description of the electromagnetic field enters. This entails the use of additional variables in the solution. In an application with different chemical species, the concentration of each of the species enters, together with a description of the transformation between the different chemical compounds. In multiphase flow, such as e.g. oil and steam, or water and air, all fluids require equations and variables for a proper description.

The pre-processing and post-processing, steps 3 and 5 respectively, are normally separate programs. Occasionally, they can be incorporated in the numerical solver.

In step 3 the grid is generated once for a given geometry. In current practice a grid can contain many millions of points. Very large computational grids are normally composed of different blocks. Such a multi-block grid can then be distributed to multiple processors or even to different computers for a parallel computation. Some numerical simulation programs are able to refine or derefine automatically the grid locally using an error estimation based on the computed solution. Some programs use such a capability to compute a time-accurate simulation where a concentration of grid points follows a physical phenomena like e.g. a vortex or a shock. In the case of a time-accurate simulation, step 4f is repeated for each intermediate solution of interest. This is e.g. the case for the instationary behavior of a turbo machine where the radiated sound is computed. Another example is combustion.

The practical use of numerical simulations is illustrated in step 5, where the output of the program is transformed into a useful result. The output of the numerical simulation can serve many purposes, depending on the application. Quite often, this involves the pressure, since this relates to forces on the object under design. For a wing, this can be the Mach number for restricting the shock strength. For turbo machines, this can be the pressure on the blades, or the thermal load. For a heart valve, this can be the velocity field which needs to be smooth to avoid cluttering. For a forest fire simulation, this is again the velocity field to predict the likely progress of the fire.

Normally, the person who runs the program makes use of the output as illustrated in step 6. The output can also be fed back without human interference into the program. This is e.g. the case for inverse methods, where the desired pressure distribution is prescribed in the form of a goal. The geometry of the object and the related grid possess degrees of freedom which allow optimization to reach the goal. Remark that the purpose in the example above is the optimal geometry of the wing. The numerical solution is a convenient tool to achieve this goal.

At the core of the numerical simulation is the approximation of space derivatives as used in step 4d. The discrete mathematical equations which are used in that step are the subject of the invention.

For the computation of each value of a space derivative at a grid point, also called node, one of the methods, known under the name of Finite Differences, consists of the computation of an approximate value of each space derivative as a linear combination of values of the parameter(s) taken at each of the points of a set of grid points, called stencil, which are in general points surrounding the point of computation, and with weighting coefficients chosen in such a way that the best possible approximation results.

Another method is the Finite Volume method, which is very closely related to Finite Differences, and is based on an integral formulation using fluxes through a control volume. These fluxes are in turn a function of a number of the nodal unknowns, defining again a stencil. The number and relative importance of nodes involved in the fluxes allows for optimizing the approximation according to predefined criteria.

Yet another method is the Finite Element method, where the space is subdivided into elements, containing nodes at which the approximation of the physical parameter(s) u is stored. Basis functions 0, also called interpolation functions, are defined on the elements, which are used to approximate the physical value u on the element. The integral of the derivative is computed on the element, using a test function V, also called weighting function. The combination of X and V is then chosen in such a way that the approximation of the derivative is optimal.

Then, there are Distribution Methods. They share with Finite Elements the representation of the unknown(s) is on the element. One variant, the Residual Distribution method shares with the Finite Volume method a volume over which the integral of the derivative is computed. The integral of the derivative is split into parts which are distributed over the nodes. Another variant, the Flux Vector Distribution method uses like the Finite Volume method fluxes through a control volume. These fluxes are distributed over the nodes. In both cases, the characteristics and the optimization of the discretization follow from the choice of the distribution coefficients.

All these methods have in common that the approximation is ultimately dependent on the values of the parameter(s) at the nodes of the stencil, and that certain discretization parameters, which are inherent to the particular numerical framework under consideration, influence the accuracy of the approximation and the numerical properties of the numerical simulation of the physical phenomena.

The choice of the stencil, the values of the discretization parameters and the associated numerical method are commonly called the numerical scheme of the numerical simulation of physical phenomena.

Stencils are commonly classified according to the relative position of the points with respect to the advection direction in velocity fields. In an upwind discretization, the stencil has nodes which are upstream of the point where the derivative is computed. Another type of discretization is central, where the stencil is symmetric with respect to the advection speed for the point where the derivative is computed. Finally, there are many discretizations which are a combination of the two.

Concerning the grid, one can use a regular or structured mesh, formed by N families of rectilinear or curved lines, where the mesh points are located at the intersections. The number of families of lines corresponds to the number of space dimensions. Another type of grid, called unstructured grid, uses a connection table to identify the points of a stencil, and the points are in general less regularly positioned in space. However, unstructured grids can be locally perfectly regular, allowing to discern locally families of lines.

The accuracy of the simulation depends directly on the grid spacing. If the error in each space derivative reduces linearly with the mesh size, the scheme is said to be of first order. If the error reduces quadratically with the mesh size, the scheme is said to be of second order. In general, when the error reduces with the power M of the mesh size, the scheme is said to be of order M.

For a given application, the choice of the scheme is linked with practical constraints of the computation, called numerical constraints, which correspond to certain priorities imposed by the user on resulting errors of the simulation. Among the numerical constraints, one may refer to consistency, convergence and stability of the simulation, the desired order of the scheme (industrial applications require an order of at least 2), the diffusion and dispersion properties of the numerical scheme, and computational cost (which may impose a maximum size of the stencil, generally indicated by compactness).

The order of the approximation and the extent of the stencil are related. On a stencil of given extent, the order of accuracy of an approximation is limited. In other words, for an approximation of a given order, the stencil has to have a certain minimum extent. It depends on the numerical constraints of the application if the size of the stencil or the order of the approximation is predominant. When the appropriate combination of the size of the stencil and the desired accuracy is chosen, remaining degrees of freedom can be used for optimizing other numerical constraints.

An extended description of the above, and of numerical methods in general can be found in (D1), "Numerical computation of internal and external flow", C. Hirsch, J. Wiley & Sons, New York, Vol. 1, Fundamentals of numerical discretization, 1988 and Vol. 2, Computational methods for inviscid and viscous flows, 1990.

There are various methods to obtain the discretization parameters appearing in the specific numerical framework. In general, a truncated Taylor series expansion with respect to the computational point is used for the value of the physical parameter(s). Given that only the first terms of the Taylor series are used, the value obtained is accompanied with an error, called truncation error, which depends in particular on the degree of the last retained term in the series. The discretization parameters are then chosen such that they optimize the error in the discretization of the derivative, which is a function of the values resulting from the truncated Taylor series. Other criteria follow from considering the Fourier transform of the discretization, thereby choosing the discretization parameters in such a way that the behavior of certain Fourier components is optimized. This means tuning the dissipation and dispersion of the numerical scheme, optimizing for the stability of the numerical scheme, or for the damping of certain components resulting in accelerated convergence. Other optimizations related to the choice of the discretization involve computational cost, ease of use in multi-block codes, ease of coding and others.

As pointed out, for each application, the most appropriate choice has to be made on:
  the numerical formulation with associated discretization parameters which is used for the simulation,
  the stencil itself, and notably the number of points and their relative position with respect to the point of computation,
  the optimization of the discretization, e.g. based on the truncation error in the truncated Taylor series expansion used in the computation of the discretization parameters, or based on the behavior of certain Fourier components, or other.

Many methods for numerical simulation have been proposed and are used in industry with more or less satisfactory performances. The above mentioned books D1 give an overview of the mathematical models, discretization techniques, numerical schemes and solution methods for the numerical simulation of space derivatives in flow phenomena. In particular, in D1 Volume 1, part 2, chapter IV, pages 167-180, the fundamentals are described of the method of Finite Differences, on a regular grid in one dimension. As explained, the weighting coefficients used in the linear combination can be determined if the number of points of the stencil is coherent with the order of the desired discretization. In particular, the book mentions the general method of Hildebrand for determining Finite Difference formulas.

An example is a general one-dimensional discretization for a derivative at node i which uses the stencil between the nodes i−m and i+n, where m and n are given positive integers. On the stencil S=(i−m,i−m+1, . . . , i−1,i,i+1, . . . , i+n−1,i+n), the approximation of the first derivative can be written as $$u_x = \frac{1}{\Delta x}(a_{-m}u_{i-m} + a_{-m+1}u_{i-m+1} + \ldots + \quad (1)$$
$$a_{-1}u_{i-1} + a_0 u_i + a_1 u_{i+1} + \ldots +$$
$$a_{n-1}u_{i+n-1} + a_n u_{i+n}).$$

The coefficients $a_j$, $j \in S$ determine the numerical properties of the discretization. A general description of the above discretization can be found in D1 which discusses the method for obtaining the coefficients $a_j$. Expression (1) also generalizes to higher derivatives.

The conjunction in two or more dimensions of the above one-dimensional discretization has a small error if the preferential direction points from one grid point to another, following a grid line. In between, the error becomes quite large. The reason is that a derivative which is related to a preferential direction has to be approximated with grid-based derivatives. Grid-based derivatives are using values of the physical unknown(s) which are stored at predefined positions of the grid. A conjunction of one-dimensional discretizations uses only points on the grid lines, and not in between.

This is illustrated in FIG. 1, where a part of a two-dimensional structured grid is shown. The indices are for the x-direction 0,1, . . . , i−1, i, i+1, . . . , $i_{max}$ and for the y-direction 0,1, . . . , j−1, j, j+1, . . . , $j_{max}$, and the nodal unknowns are indicated by $u_{i,j}$ for node i, j. Indicated are two directions, $\vec{a}_1$ and $\vec{a}_2$. Both point from one grid point to another, but only $\vec{a}_1$ follows a grid line, and the discretization has a small error. For the direction of $\vec{a}_2$, the error is maximal when using a conjunction of one-dimensional discretizations.

The report (D2), "Progress in multidimensional upwind differencing", B. van Leer, NASA Contractor Report 189708, ICASE report #92-43, September 1992, NASA Langley Research Center, Hampton, Va., describes different known approaches for the simulation of convection phenomena in two dimensions which go beyond one-dimensional methods. In this framework, different state of the art approaches have been proposed to optimize the methods of numerical simulation in two dimensions, with more or less satisfactory performances. Only the methods using an unstructured grid have been exploited in practice using a low order upwind scheme.

In the majority of practical applications, the physical phenomena take place in three dimensional space, which makes it indispensable to realize a numerical simulation of at least three dimensions. In practice, it may be necessary to use more than three dimensions, e.g. to incorporate time as additional dimension, taking into account the fact that an unsteady physical process in N dimensions can be modeled by a N+1 dimensional steady process.

However, actually all the industrial methods of numerical simulation in three dimensions (cf. e.g. the documents D1 and D2) are limited to a conjunction of one-dimensional methods.

Besides these one-dimensional methods, certain attempts of truly multi-dimensional numerical simulations in three dimensions have been reported. Nevertheless, taking into account the complexity of the problem presented, and the difficulties encountered in two dimensions, the use of a truly multi-dimensional method in three or more dimensions is considered to be extremely complex.

The paper (D3) "Optimum positive linear schemes for advection in two and three dimensions", P. L. Roe and D. Sidilkover, SIAM J. Num. Anal., December 1992, #6, vol. 29, pages 1542-1568, constitutes one of the rare publications which treat until now a scheme for the simulation of advection phenomena, considering a class of first order upwind schemes. In the case of three dimensions, the authors of the paper, like all authors until now, consider it suitable to choose on a structured grid a minimal upwind stencil formed by a cube of eight points.

Having chosen and predefined this stencil, the different weighting coefficients are computed to obtain the best simulation possible, which is the case of the scheme called "N scheme". Denote the components of the vector $\vec{a}$ of the preferential direction in N dimensions by a, b, c, ..., that is $\vec{a} = (a, b, c, \ldots)^T$. One-dimensional upwind schemes take the discretization stencil based on $a \geq 0$ or $a \leq 0$. Applying a conjunction of one-dimensional discretization in N dimensions means choosing the stencil depending on the sign of a, b, c, ... separately. The N scheme uses instead the combination $a \geq b \geq c \geq \ldots \geq 0$ and points of the stencil which do not lie on a grid line through the point of computation P. Nevertheless, the results obtained with the scheme given in the paper are largely insufficient in practice. Indeed, one cannot obtain a high order scheme with this method on such a small stencil. Furthermore, the simulation in three dimensions generates specific problems which are not encountered in two dimensions.

Moreover, since the date of this paper, no author has effectively imagined that it is possible to obtain higher order accurate discretizations using a larger stencil which includes points beyond the grid lines on a structured grid in three dimensions.

However, as indicated by the publication (D4) "Numerical Aerodynamics: Past Successes and Future Challenges from an Industrial Point of View", David Paul Hills, Computational Methods in Applied Sciences, 1996, ECCOMAS, pages 166-173, one-dimensional methods as used in industry have reached their limits, and real gains should be sought in multi-dimensional methods. In spite of continued research since 1992, no such method has been found yet.

Furthermore, the majority of the publications on this subject since 1990 indicate, like the previous, that the true multi-dimensional methods imply upwind discretizations on unstructured grids. Neither multi-dimensional efforts on structured grids nor attempts to find central space discretizations with a reduced error have resulted in numerical simulations which can be applied in an industrial environment.

The invention aims to dispose of these shortcomings by proposing a simulation method which provides a simulated numerical representation in N dimensions, with $N \geq 3$, of spatial $p^{th}$ derivatives $D_p$, $p \geq 1$, of at least one physical parameter u of a phenomenon to which is associated a velocity field d which determines a preferential direction in every point of at least a part of space, and which permits to reduce significantly the error in the numerical simulation,
a consistent, stable and convergent simulation,
a locally monotone simulation,
the simulation of spatial $p^{th}$ derivatives, with p>1, with an error of a desired order, incorporating numerical constraints as desired.

The invention aims also to propose a method which
is compatible with current technologies, notably computation time and memory requirements,
is compatible with the simulation of nonlinear phenomena,
can be used for systems of equations,
can be used with acceleration techniques like e.g. multi-grid, GMRES and preconditioning,
and which allows simulations in Finite Element formulations, Finite Volume formulations, Finite Difference formulations, Residual Distribution formulations, Flux Vector Distribution formulation, or others.

The invention also aims at providing a global simulation method of a physical phenomenon and a data processing system, a software, in particular in the form of a digital storage medium, to implement such methods.

SUMMARY OF THE INVENTION

The purpose of this invention is to provide a method of simulating behavior of a flow interacting with an object. At the heart of a numerical simulation is the approximation of space derivatives of a parameter of the flow. An approximation of a space derivative of a parameter involves the use of the value of the parameter at various points at the computational grid. This approximation entails an error, and the larger the error, the larger the cost for a simulation of acceptable accuracy.

The invention improves the accuracy of the approximation of the spatial $p^{th}$ derivative $D_p$, $p \geq 1$, and therefore reduces the cost of the simulation. It does so by including in the approximation values of the parameter at points which do not lay on grid lines passing through the point of computation P, and by using these values to optimize the approximation. One example is including points on diagonal lines through P, but the invention also describes more general methods. The use of these additional points depends on a preferential direction, such as determined by the advection direction of the flow. The points used in the approximation extend beyond a unit cube on the computational grid. The simulation is in three or more dimensions. The numerical simulation produces output which can be used in the design or optimization of the object which interacts with the flow. In certain cases, it is the output by itself which is important. This is e.g. the case for weather prediction or forest fire simulation.

It is the combination of the extent of the stencil, the use of points which are not on grid lines passing through point P and the optimization of the approximated value $D_p^A$ using the preferential direction which are at the core of the invention. This combination leads to a significant reduction of the error in the approximation of the derivatives, and it allows higher order approximations, which are essential in an industrial context. The improvements of the invention are fully compatible with the current computational practice and aim to dispose of shortcomings of current grid-aligned discretizations by proposing a simulation method which permits:

to reduce significantly the error in the numerical simulation,
a consistent, stable and convergent simulation,
a locally monotone simulation,
the simulation of spatial $p^{th}$ derivatives, with $p \geq 1$, with an error of a desired order, incorporating numerical constraints as desired.

The invention aims also to propose a method which
is compatible with current technologies, notably computation time and memory requirements,
is compatible with the simulation of nonlinear phenomena,
can be used for systems of equations,
can be used with acceleration techniques like e.g. multi-grid, GMRES and preconditioning,
and which allows simulations in Finite Element formulations, Finite Volume formulations, Finite Difference formulations, Residual Distribution formulations, Flux Vector Distribution formulation, or others.

The above describes the invention, which aims at improving the numerical tool for the design and the optimization of commercial products, thereby reducing the computational cost of numerical simulations and the time of the design-cycle.

The invention also aims at providing a global simulation method of a physical phenomenon and a data processing system, a software, in particular in the form of a digital storage medium, to implement such methods.

BRIEF DESCRIPTION OF THE DRAWINGS

The following drawings have been included in the description for a better understanding of the invention.

Figure 1:
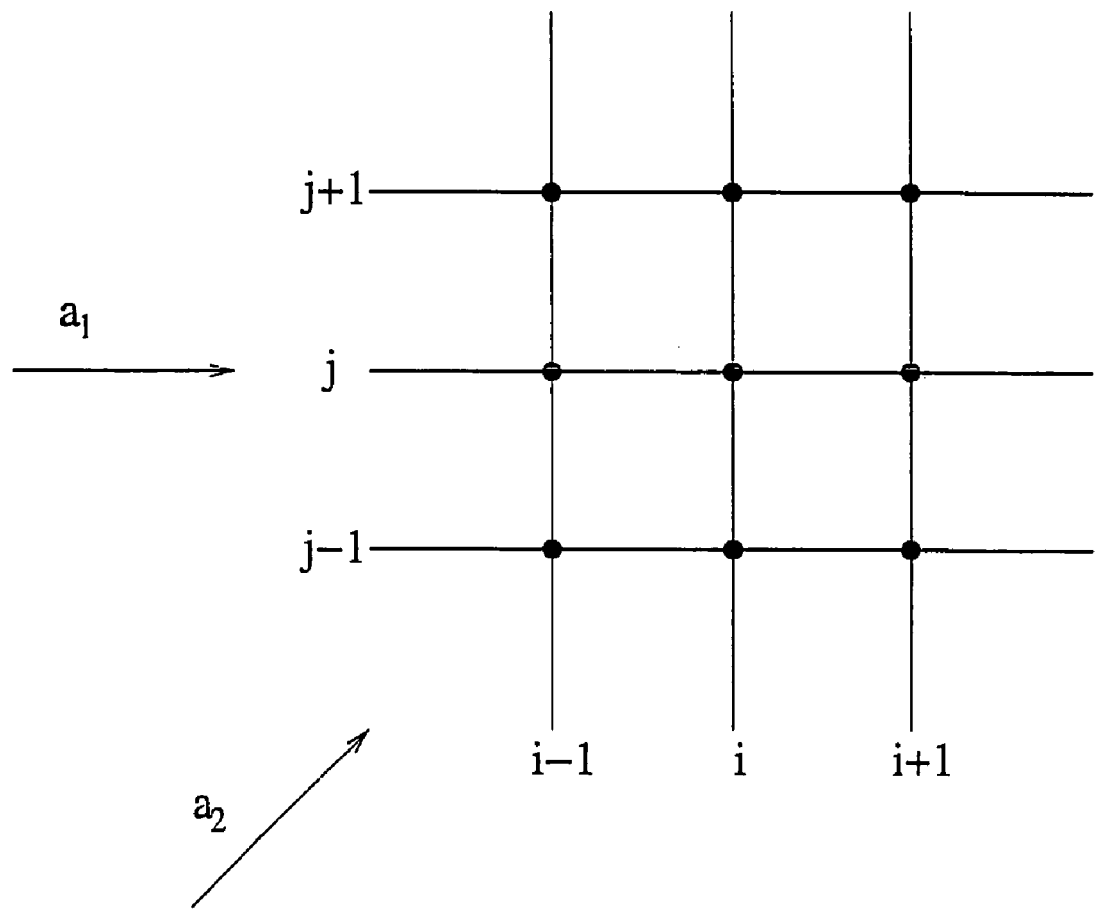
FIG. 1: Illustration of a part of a two dimensional structured grid with two different advection directions.

The drawings illustrate in concrete form specific applications of the invention. The drawings are not meant to exclude from the scope of the invention any application which is the result of any normal and expected modification or extension of the specific application.

DETAILED DESCRIPTION OF THE INVENTION

The derivatives according to the invention are called directional derivatives.

The following description uses mathematical symbols, which are explained where introduced, and which, for the purpose of completeness, are summarized in a table at the end of the description.

In the following, a derivative of the form $\partial^p u/\partial e_i^p$ for certain i and p is called a pure derivative, and a derivative of the form $\partial^p u/\partial e_1^{p_1} \partial e_2^{p_2} \ldots$ with $p_1+p_2+\ldots=p$ involving partial derivatives along at least two coordinate directions, is called a mixed derivative. The definition is valid for all coordinate systems considered.

A Simulation Method Using Directional Discretizations of Spatial $p^{th}$ Derivatives, $p \geq 1$, in N Dimensions, $N \geq 3$ on Structured Grids.

This invention concerns a method of simulating behavior of a flow interacting with an object. The method provides a simulated numerical representation in N dimensions, $N \geq 3$. The representation is composed of a plurality of approximated values at a multitude of points in at least a part of space where the flow interacts with the object. The approximated values are of a physical parameter u of the flow to which is associated a velocity field a which determines a preferential direction. The numerical scheme of the simulation approximates at least one spatial $p^{th}$ derivative $D_p$, $p \geq 1$, of the parameter u at the points of the part of space. The method comprises the following steps:

For the part of space a discrete N-dimensional grid constructed by N families of coordinate lines is used.

In at least one point P of the grid, called the point of computation, an approximated value $D_p^A$ of $D_p$ is computed with an error $\epsilon_n$. This is achieved by using values $u_s$ of the parameter in a collection of grid points. The collection of grid points is called the stencil S. The simulation also uses computational functions $C_c$, evaluated with the values $u_s$ which depend on the numerical framework in which $D_p$ is expressed.

The computational functions for the approximated value $D_p^A$ are chosen in such a way that the approximated value $D_p^A$ is optimized for the preferential direction.

The stencil S contains at least one point situated outside all the coordinate lines passing through the point of computation P, and the stencil S is chosen in such a way that it contains at least a first point and a second point, the first point being defined by N first coordinate lines of the N families of lines, the second point being defined by N second coordinate lines of the N families of lines, and for at least one family $N_f$ of the coordinate lines, the first coordinate line belonging to the family $N_f$ is different from and not adjacent to the second coordinate line belonging to the same family $N_f$.

An output is obtained for the numerical representation that simulates, for the part of space, behavior of the flow interacting with the object.

The above describes the invention, which aims at improving the numerical tool for the design and the optimization of commercial products, thereby reducing the computational cost of numerical simulations and the time of the design-cycle. This is achieved according to the invention by reducing the error in the approximation of derivatives, as described above. In certain cases, it is the output by itself which is important. This is e.g. the case for weather prediction or forest fire simulation.

It is the combination of the extent of the stencil, the use of points which are not on grid lines passing through point P and the optimization of the approximated value $D_p^A$ using the preferential direction which are at the core of the invention. This combination leads to a significant reduction of the error in the approximation of the derivatives, and it allows higher order approximations, which are essential in an industrial context, while retaining any of the desired properties mentioned before.

The numerical simulation of physical phenomena is well known, and numerical solutions obtained from computer codes are used in many domains of industry. We will recapitulate the steps which enter into the daily routine of the application of numerical simulations according to the invention. The methodology applies to many domains and applications. The description is an illustration, and is not meant to restrict the invention.

When the decision is taken to use a numerical simulation for the design or optimization of a commercial product, the department responsible for the simulation does the following:

1. A decision is made on which part of physics is important to describe in enough detail the phenomena in a meaningful simulation. In many fluid dynamics cases, the basic fluid dynamics equations like the Navier-Stokes equations are adequate. Perhaps a more simple description can be used. If viscous effects are less important, the Euler equations can be used. At low Mach number, an incompressible approximation can be used. Maybe the potential flow approximation is sufficient. On the other hand, a turbulence model may be needed, together with acoustic models, and a description of the deflection of the object under aerodynamic forces.

The physical description is expressed in a mathematical model comprising of one or more equations which describe the relations between the physically relevant parameters (mass, density, energy, forces, impulse, pressure, volume, temperature, species concentration, charge density, magnetic field, ... ). In general, the mathematical model uses spatial derivatives of one or more of the parameters, as well as time derivatives. Together with the number of space dimensions, the physical model determines the number of variables which are needed in the solution. In the case of the Navier-Stokes equations in three dimensions, five variables which depend on space and time describe the physical solution. These five variables can be e.g. the density, the momentum in the three directions and the energy. This set of variables is commonly known as conservative variables. Other combinations are possible, such as the density, the three velocity components and the pressure, which is known as the set of primitive variables. Yet another set of variables is known as entropy variables, since one of the variables is chosen to be proportional to the entropy. There are still many other sets of independent variables. A transformation is always possible between different sets of independent variables.

2. The next step is to choose a computer program which can compute a solution to the problem which is compatible with the physical description of the problem. The simulation code will be run on a computer. While the physics and the mathematical model describe a continuum, the computer can only work with discrete values in a limited number of points. The solution of the mathematical model with a computer program therefore involves the procedure of discretization, which consists of two steps.

First, the continuous variable is replaced by a discrete variable in space. A grid defines points in space where the values of the parameters are stored.

The second step is to rewrite the relations between the continuous variables of the mathematical model in relations between discrete variables. In particular, the derivatives which appear in the mathematical model are replaced by their discrete equivalent, which are differences which are locally calculated using the values of the discrete variables of the surrounding grid points. This step involves an approximation and is not exact.

In general, a big enough company has the means and experience to develop and maintain an in-house computer code. Such a code is tuned to the specific needs of the company. It may compute solutions to only a very restricted number of physical problems, but it is likely to be up to date. The developments in the domain are followed, and e.g. new space discretizations, faster solution techniques such as accelerators and so on are coded. After testing, the code is ready for production runs. Smaller enterprises often can afford only a small computational group, which uses programs from a specialized provider. This is normally a more general code, since it will have to accommodate a larger spectrum of clients with different applications.

3. The computation of the numerical solution is preceded by a pre-processing step. A geometrical description of the object is used to generate a computational grid. This grid defines the points in space where the solution is calculated. Together with this grid an initial solution is generated. In the case of the Navier-Stokes equations, the five independent variables are given a certain value for each of the grid points, corresponding to e.g. uniform flow at the design Mach number. The grid and the initial solution are written to one or more files.

4. The next step is to run the simulation code. The program performs the following actions
   a) The program reads the grid, and stores for each point the coordinates in the memory of the computer.
   b) It reads the initial solution and stores for each grid point the value of the physical parameters in memory.
   c) Additional files are read which specify computational parameters such as the number of iterations or a convergence criterion, which physical model to use, which of the coded space discretizations to use, and additional information if necessary. Boundary conditions are specified which are used at the extremities of the part of space under consideration. They represent inflow and outflow from the domain, the way the object influences the flow, and any other interaction of the flow with its surroundings.
   d) Using the grid, the initial solution and the boundary conditions, it solves iteratively and approximately the discrete mathematical equations which describe the physical problem. At the core of the numerical simulation is the approximation of space derivatives. The invention provides improved discretization with a reduced error.
   e) The code stops after a specified number of iterations, or when a solution is obtained which is accurate enough.
   f) The code writes the solution to a file. This output solution consists of the value of physical variables in each of the grid points, where the number of physical variables corresponds to the problem. Another output file may be written which contains the grid.

5. A post-processing program is used to read the grid file and the output file of step 4f. Normally this very general program permits to extract any desired physical parameter which can be computed from the solution. If the solution is written in the form of conservative variables, this program can compute the pressure, which is needed for e.g. the lift and drag. It can also compute variables like the Mach number, the temperature and so on.

6. The results are used to modify or improve the geometry.

Steps 3-6 are repeated until the design is optimal. In the case of insufficiency of the physical model, a more elaborate one is chosen, and coded if necessary. If there is insufficient resolution of the simulated physical phenomena on parts of the grid, a finer grid is generated.

The above describes the typical computation of a numerical solution and its use in an industrial environment. A similar procedure is followed when the purpose is to design or to optimize a part of an aircraft, a car, a ship, a vehicle in general, a turbo machine, a ventilation system, a wind mill, a pump, a combustion engine, a channel, the mixture of steam and oil or water and oil in porous media for oil recovery, and so on, or to describe the evolution of flow such as in weather prediction, climate modeling or in a forest fire. In step 1, the physical model depends on the problem under consideration. In a magneto-hydrodynamics application, the description of the electromagnetic field enters. This entails the use of additional variables in the solution. In an application with different chemical species, the concentration of each of the species enters, together with a description of the transformation between the different chemical compounds. In multi-phase flow, such as e.g. oil and steam, or water and air, all fluids require equations and variables for a proper description.

The pre-processing and post-processing, steps 3 and 5 respectively, are normally separate programs. Occasionally, they can be incorporated in the numerical solver.

In step 3 the grid is generated once for a given geometry. In current practice a grid can contain many millions of points. Very large computational grids are normally composed of different blocks. Such a multi-block grid can then be distributed to multiple processors or even to different computers for a parallel computation. Some numerical simulation programs are able to refine or derefine automatically the grid locally using an error estimation based on the computed solution. Some programs use such a capability to compute a time-accurate simulation where a concentration of grid points follows a physical phenomena like e.g. a vortex or a shock. In the case of a time-accurate simulation, step 4f is repeated for each intermediate solution of interest. This is e.g. the case for the instationary behavior of a turbo machine where the radiated sound is computed. Another example is combustion.

The practical use of numerical simulations is illustrated in step 5, where the output of the program is transformed into a useful result. The output of the numerical simulation can serve many purposes, depending on the application. Quite often, this involves the pressure, since this relates to forces on the object under design. For a wing, this can be the Mach number for restricting the shock strength. For turbo machines, this can be the pressure on the blades, or the thermal load. For a heart valve, this can be the velocity field which needs to be smooth to avoid cluttering. For a forest fire simulation, this is again the velocity field to predict the likely progress of the fire.

The simulated numerical representation may be the values of the physical parameter, or the variations of the physical parameter in time or in space, or any combination of the physical parameter. The simulated numerical representation can be used in the design or optimization of an object by a transformation of the representation, using post-processing tools, e.g. into a film or video such as showing the evolution of a flow, especially unsteady effects such as buffeting, or an image such as a flow field, or a curve such as lift versus drag of a wing, or a coefficient such as the overall drag, or in general any transformation as required by the application under consideration.

Normally, the person who runs the program makes use of the output as illustrated in step 6. The output can also be fed back without human interference into the program. This is e.g. the case for inverse methods, where the desired pressure distribution is prescribed in the form of a goal. The geometry of the object and the related grid possess degrees of freedom which allow optimization to reach the goal. Remark that the purpose in the example above is the optimal geometry of the object. The numerical solution is a convenient tool to achieve this goal.

Figure 2:
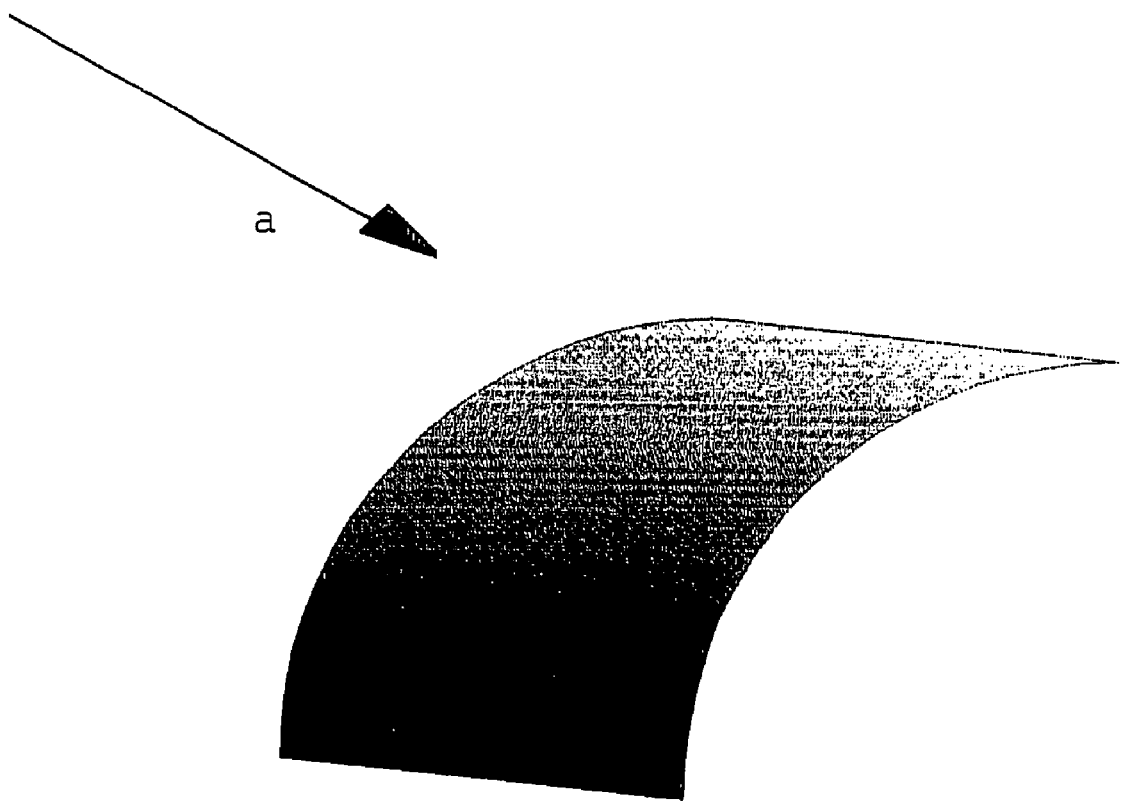
FIG. 2: Perspective view of a material object with a vector of preferential direction.

A three-dimensional example is given in FIG. 2, where a solid surface is exposed to a flow. The surface can be e.g. a wing, a blade of a propeller, part of a duct, the hull of a ship or submarine, a part of an aircraft or a car, or in general the surface of any object encountered in an industrial context which needs to be designed or optimized. The velocity is indicated by the vector a.

The design or optimization with a numerical tool implies an approximation of derivatives of the physical parameter u. Such a derivative is e.g. a stream-wise first derivative as encountered in flow problems, $D_1 = \vec{a} \cdot \vec{\nabla} u$, where $\vec{\nabla}$ is the N-dimensional gradient, $\vec{\nabla} u = (u_x, u_y, u_z, \ldots)^T$, which is composed of grid-based derivatives. The invention concerns the approximation $D_p^A$ using the combination of grid-based derivatives $u_x, u_y, u_z, \ldots$ and other combinations for the approximation of higher derivatives with a reduced error.

Figure 3:
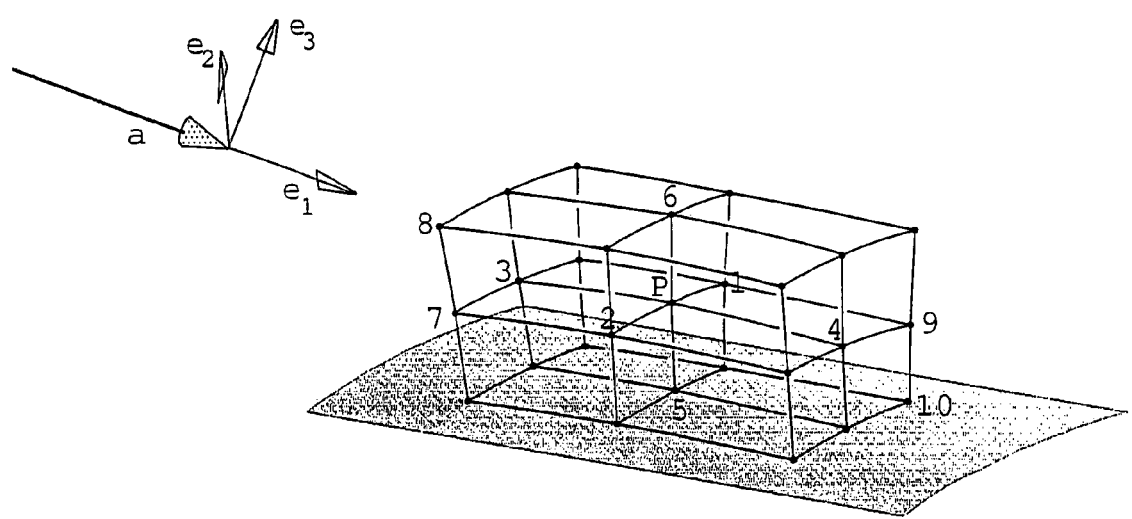
FIG. 3: Perspective view of a part of a material surface of an object (wing, hull, . . . ) in a velocity field $\vec{a}$ (fluid dynamics, electro-magnetics, . . . ) with a part of a curvilinear grid formed by N (N=3) families of lines, containing points 1-10, and the point of computation P, together with a local basis B which has the basis vector $\vec{e}_1$ aligned with the vector of preferential direction $\vec{a}$.

For the approximation of derivatives, the tool has at its disposition the approximated values $u_s$ stored at certain positions in space, according to a grid as indicated in FIG. 3, which is a blow-up of a part of FIG. 2.

The points 1, P and 2 lie on a grid line of one family, while the points 3 and 7 and the points 4 and 9 lie on different lines of the same family. The points 3, P and 4 lie on a grid line of another family, while the points 1 and 9 and the points 2 and 7 lie on different lines of the same family of lines as points 3, P and 4. Finally, the points 5, P and 6 lie on a grid line of yet another family, which family is shared by the points 7 and 8 and the points 9 and 10, although the latter are on different grid lines.

Especially, in FIG. 3, point P indicates a position where the numerical tool needs a derivative approximation. This derivative approximation is a function of the values of $u_s$ at the nodes of the stencil S which are used to approximate the derivative.

The precise way in which the unknowns us are used in the computation of the derivate depends on the numerical framework which is used in the numerical tool. In a given numerical framework, this depends on computational functions specific to that framework. In the case of the Finite Difference framework, the computational functions are coefficients, and the values of the physical parameter $u_s$ at the points of the stencil S is multiplied with its coefficient, and the linear combination of values constitute the approximation of the derivative. In the case of the Finite Volume framework, the fluxes through the surfaces of a volume around P depend on the values of the physical parameter $u_s$ at the points of the stencil S. These and other formulations are described in more detail below, but in general, the approximation of the derivative depends on the values $u_s$ at the points of the stencil S through the use of computational functions which depend on the numerical framework used.

Since the approximation of the derivative depends on the values us at the points of the stencil S, an expansion of each of the values us into a truncated Taylor series with respect to the point P is instrumental in obtaining an estimation of the error of the approximation of the derivative. The use of Taylor series is especially useful when optimizing an approximation of a derivative with a prescribed order of accuracy when the maximum extent of the stencil is given. This is often the case for the numerical tool used in industry. Given these conditions, it is possible to make an inventory of all the consistent approximations of the grid-based derivatives involved in $D_p^A$. This general approximation of each of the grid-based derivatives takes the form of a sum of stencils. One of the stencils in the sum represents a particular consistent approximation to the grid-based derivative, while each of the remaining stencils in the sum appears with a coefficient which represents a degree of freedom. The stencils associated with a degree of freedom are approximations which are only apparent in $D_p^A$ in the leading error term or beyond. The coefficients can be constants, or a function of physical parameters, such as the preferential direction, e.g. through the angles of the transformation which links the basis B with the grid. In the latter case, the approximation of $D_p^A$ becomes also dependent on the angles.

The discretizations for first and higher derivatives are constructed in a systematic way as described above, which is very well suited for an implementation in a computer program. Such a program is joined in appendices 1-5 to the instant specification.

An alternative is the formulation of Hildebrand, see D1, which however needs to be generalized for use in N dimensions. Such a generalization has been obtained, and leads to the same results.

In the following, the various terms involving sums of stencils will be indicated by T, possibly with a subscript to indicate a particular grid-based derivative. An example is given in appendix 6, where a general approximation is described in three dimensions to a stream-wise first derivative which is second order accurate on a grid around P with an extent of three points in each direction, i.e. containing $3^3 = 27$ nodes. The grid is similar to the one shown in FIG. 3. The grid-based derivatives which are needed in the approximation of $D_1^A$, $u_x$, $u_y$ and $u_z$ are each expressed as just described. There are 17 degrees of freedom for each grid-based derivative, as indicated by the coefficients $k_{x1} \ldots k_{x17}$ for $u_x$, and similar for the other derivatives. Other examples are given further on.

Already on a small grid, the number of degrees of freedom is large. On more extended grids, this number increases rapidly, and the newly found degrees of freedom open a vast region of optimization and allow for important error reductions. The complete set of stencils, representing all the degrees of freedom is an integral part of the invention.

The leading error term can be a guideline in the choice of the stencil S for optimizing the derivative. As an example, the parts of the error which are related to directions normal to the preferential direction can be eliminated, partially or totally, for certain or all directions. The derivative can also be optimized using a representation of the numerical solution in Fourier components. The use of Fourier components permits to analyze a discretization in terms of stability and convergence. Therefore, the optimization can be according to criteria concerning stability, convergence, damping of high-frequency components which are important for multi-grid acceleration, dispersion of the discretization, important for the behavior of wave propagation as encountered in acoustic applications, and so on and so forth. The degrees of freedom described just above are particularly appropriate for such an optimization. The optimization of the derivatives is for certain preferential directions. Remark that the optimization of the error or of Fourier components are just two examples. Other optimization criteria are effectively any numerical property of the discretization, as explained in D1, including symmetry of the resulting stencil, a minimum number of contributing nodes to the stencil for computational cost, ease of implementation, and combinations thereof. It is to be noted that adding a discretization of sufficiently high order to the approximation of the derivative does not harm the optimization.

As an example, for the preferential direction a indicated in FIG. 3, the error of the numerical simulation due to the approximation of the derivative can be significantly reduced by the use of an approximation which uses the stencil S, given by the list of the nodes of which it consists, S={P, 1, 2, 7, 8, 9, 10}. Remark that the nodes 7-10 do not lie on grid lines passing through the point of computation P. Furthermore, the stencil S is extended in the sense that it does not fit in a unit hypercube of the grid. An example of a unit hypercube of the grid is the cube which has as constituting edges the three edges P-2, P-4 and P-6.

By using the approximations of derivatives according to the invention, the error is reduced, the numerical tool is improved and the computational effort is reduced. In a typical industrial application, the numerical tool may use an implicit fourth order method for the approximation of derivatives. Using the invention, the average error can then be reduced by a factor of 4, and the same quantitative simulation can be obtained for one fifth of the computational cost.

As an example, some of the discretizations are described below, optimizing the error or optimizing Fourier components, in the Finite Difference formulation and in the Finite Element formulation, on a rectilinear grid, but the scope of the invention is not limited to those. It should be equally understood that the invention can be used on grids which are normally encountered in industrial applications of numerical simulations. Such grids can be perfectly regular, or contain distortions, they can be static, moving, deforming or rotating. The invention applies to staggered and to non-staggered grids, single block or multi block, and any combination of the aforementioned characteristics.

A Simulation Method Using Continuous Directional Discretizations of Spatial $p^{th}$ Derivatives, $p \geq 1$, in N Dimensions, $N \geq 3$ on Structured Grids.

The discretizations of the invention depend on the preferential direction. This means that the stencil for an approximation involves different sets of points. For one direction, one set of points is used in the approximation, while for another direction a different set is used. Examples are given further on.

It is important that the approximation $D_p^A$ depends continuously on the values $u_s$. In other words, the stencil should not change discontinuously for a small variation of the preferential direction. Continuity of the approximation is important for the convergence of the numerical method.

A Simulation Method Using Directional Discretizations of Spatial $p^{th}$ Derivatives, $p \geq 1$, in N Dimensions, $N \geq 3$ On Structured Grids, Optimizing the Discretization Using a Local Basis.

The above derivatives can be optimized using a local basis. This means that a local basis $B(\vec{e}_1, \vec{e}_2, \vec{e}_3, \ldots)$ of curvilinear coordinates is used which has the unit vector $\vec{e}_1$ along the preferential direction. In the approximated value $D_p^A$, the computational functions are chosen in such a way that the contribution to the error $\epsilon_n$ of at least one pure or one mixed derivative as expressed in the local basis B is minimized, while using as a formulation of the values $u_s$ of the parameter at each of the points of the stencil S, a truncated Taylor series expansion with respect to the point of computation P with an error, called the truncation error $\epsilon_s$.

When the numerical tool needs to approximate a derivative which is related to the preferential direction $\vec{a}$, a local basis B is used which has a basis vector $e_1$ aligned with $\vec{a}$ as indicated in FIG. 3. When the error in the approximation of the derivative is expressed in this local basis B, some pure or mixed derivatives can be minimized by an appropriate choice of the stencil, and by the choice of the computational functions which are used in the numerical framework.

A Simulation Method Using Directional Discretizations with Finite Differences and a Local Basis.

The above directional discretizations can be used in the framework of Finite Differences, where the approximation $D_p^A$ is a linear combination $D_p^{LC}$ of the values of the parameter(s) $u_s$ in a collection of grid points, called stencil S, with computational functions which are individual coefficients $C_s = C_{l,m,n}$. This means that $$D_p^{LC} = \sum_{l,m,n,\ldots \in S} C_{l,m,n,\ldots} \, u_{l,m,n,\ldots}. \tag{2}$$

In the linear combination $D_p^{LC}$ the coefficients $C_s$ are chosen in such a way that the contribution to the error $\epsilon_n$ of at least one pure or one mixed derivative as expressed in the local basis B is minimized.

A Simulation Method Using Directional Discretizations with Finite Volumes and a Local Basis.

The above directional discretizations can be used in the framework of Finite Volumes. This formulation is very closely related to Finite Differences, and is based on an integral formulation using computational functions f which are fluxes through a control volume. These fluxes are in turn a function of a number of the nodal unknowns, defining again a stencil. This in turn leads to an approximation which has similarities with the expression of equation 2. In the approximation $D_p^A$ the fluxes are chosen in such a way that the contribution to the error $\epsilon_n$ of at least one pure or one mixed derivative as expressed in the local basis B is minimized.

It should be understood that the invention applies to the cell-centered Finite Volume method as well as to the vertex-centered Finite Volume method.

A Simulation Method Using Directional Discretizations with Finite Elements and a Local Basis.

The above directional discretizations can be used in the framework of the Finite Element method, where the space is subdivided into elements, containing nodes at which the approximation of the physical parameter(s) u is stored. Basis computational functions A, called interpolation functions, are defined on the elements, which are used to approximate the physical value u on the element. The integral of the derivative is computed on the element, using a test computational function $\psi$, called weighting function. The approximated value $D_p^A = D_p^{\phi,\psi}$ is expressed in the nodal unknowns us at a collection of points, called stencil S. In the approximated value $D_p^{\phi,\psi}$, the combination of $\phi$ and $\psi$ is then chosen in such a way that the contribution to the error $\epsilon_n$ of at least one pure or one mixed derivative as expressed in the local basis B is minimized.

A Simulation Method Using Directional Discretizations with the Residual Distribution Method and a Local Basis.

The above directional discretizations can be used in the framework of the Residual Distribution Method. This method shares with Finite Elements the representation of the unknowns u on the element, and with the Finite Volume method a volume over which the integral of the derivative is computed. The integral $I_{el}$ of the derivative is split into parts $\alpha_i I_{el}$ which are distributed over the nodes i. The approximated value $D_p^A = D_p^{\alpha_i}$ is expressed in the nodal unknowns us at a collection of points, called stencil S. In the approximated value $D_p^{\alpha_i}$, the distribution computational coefficients $\alpha_i$ are then chosen in such a way that the contribution to the error $\epsilon_n$ of at least one pure or one mixed derivative as expressed in the local basis B is minimized.

A Simulation Method Using Directional Discretizations with the Flux Vector Distribution Method and a Local Basis.

Another Distribution method is the Flux Vector Distribution method. Here, the representation of the unknowns is the same as for the Residual Distribution method, but now the flux f through surfaces of volumes are split into parts $\alpha_i f$ which are distributed over the nodes i. The approximated value $D_p^A = D_p^{\alpha_i}$ is expressed in the nodal unknowns $u_s$ at a collection of points, called stencil S. In the approximated value $D_p^{\alpha_i}$, the distribution computational coefficients $\alpha_i$ are then chosen in such a way that the contribution to the error $\epsilon_n$ of at least one pure or one mixed derivative as expressed in the local basis B is minimized.

A Simulation Method Using Directional Discretizations of Spatial $p^{th}$ Derivatives, $p \geq 1$, in N Dimensions, $N \geq 3$ On Structured Grids, Optimizing the Discretization Using Fourier Components.

The above derivatives can be optimized using Fourier components. This means that a representation of the numerical solutions in Fourier components is used. In the approximated value $D_p^A$, the computational functions are chosen in such a way that the Fourier components are optimized for certain directions which are related to the velocity $\vec{a}$, while using the values $u_s$ of the parameter at each of the points of the stencil S in the Fourier representation.

The use of Fourier components is clearly described in D1. Any finite mesh function, such as the solution or the error in the solution can be decomposed into a Fourier series.

The solution $u(\vec{x}, t)$ is then a superposition of harmonics of the form $$u(\vec{x},t) \sim A e^{-Iwt} e^{I\vec{k}\cdot\vec{x}}. \quad (3)$$

The following notation is used: $\vec{x}$ for the position, t for time, A an amplitude, I the imaginary unit, such that $I^2 = -1$, w the angular frequency, and $\vec{k}$ the wave number vector. These terms are explained in D1. These harmonics can be substituted in a Finite Difference representation of the discretization. This permits to analyze numerical properties of the scheme, such as stability and convergence, wave propagation and so on. The harmonics of equation 3 depend on the position vector $\vec{x}$, which is different for each of the points of the stencil S.

The numerical properties as established by using Fourier components depend on the computational functions, and therefore these functions may be chosen in such a way that certain numerical properties are optimized. This can be done for certain preferential directions as indicated in FIG. 3. Like mentioned before, for the preferential direction $\vec{a}$, certain numerical properties like stability will be optimized by the use of an approximation which uses the stencil S, given by the list of the nodes of which it consists, S={P, 1, 2, 7, 8, 9, 10}.

A Simulation Method Using Directional Discretizations with Finite Differences and Fourier Components.

The above directional discretizations can be used in the framework of Finite Differences, where the approximation $D^{pA}$ is a linear combination $D_p^{LC}$ of the value of the parameter $u_s$ in a collection of grid points, called stencil S, with computational functions which are individual coefficients $C_s = C_{l,m,n}, \ldots$, see equation 2. In the linear combination $D_p^{LC}$ the coefficients $C_s$ are chosen in such a way that the Fourier components are optimized for certain directions which are related to the velocity $\vec{a}$, while using the value $u_s$ of the parameter at each of the points of the stencil S in the Fourier representation.

A Simulation Method Using Directional Discretizations with Finite Volumes and Fourier Components.

The above directional discretizations can be used in the framework of Finite Volumes.

This formulation is very closely related to Finite Differences, and is based on an integral formulation using computational functions $f$ which are fluxes through a control volume. These fluxes are in turn a function of a number of the nodal unknowns, defining again a stencil. This in turn leads to an approximation which has similarities with the expression of equation 2. In the approximation $D_p^A$ the fluxes are chosen in such a way the Fourier components are optimized for certain directions which are related to the velocity $\vec{a}$, while using the value $u_s$ of the parameter at each of the points of the stencil S in the Fourier representation.

It should be understood that the invention applies to the cell-centered Finite Volume method as well as to the vertex-centered Finite Volume method.

A Simulation Method Using Directional Discretizations with Finite Elements and Fourier Components.

The above directional discretizations can be used in the framework of the Finite Element method, where the space is subdivided into elements, containing nodes at which the approximation of the physical parameter(s) u is stored. Basis computational functions $\phi$, called interpolation functions, are defined on the elements, which are used to approximate the physical value u on the element. The integral of the derivative is computed on the element, using a test computational function $\psi$, called weighting function. The approximated value $D_p^A = D_p^{\phi,\psi}$ is expressed in the nodal unknowns $u_s$ at a collection of points, called stencil S. In the approximated value $D_p^{\phi,\psi}$, the combination of $\phi$ and $\psi$ is then chosen in such a way that the Fourier components are optimized for certain directions which are related to the velocity $\vec{a}$, while using the value $u_s$ of the parameter at each of the points of the stencil S in the Fourier representation.

A Simulation Method Using Directional Discretizations with the Residual Distribution Method and Fourier Components.

The above directional discretizations can be used in the framework of the Residual Distribution Method. This method shares with Finite Elements the representation of the unknowns u on the element, and with the Finite Volume method a volume over which the integral of the derivative is computed. The integral $I_{el}$ of the derivative is split into parts $\alpha_i I_{el}$ which are distributed over the nodes i. The approximated value $D_p^A = D_p^{\alpha_i}$ is expressed in the nodal unknowns $u_s$ at a collection of points, called stencil S. In the approximated value $D_p^{\alpha_i}$, the distribution computational coefficients $\alpha_i$ are then chosen in such a way that the Fourier components are optimized for certain directions which are related to the velocity $\vec{a}$, while using the value $u_s$ of the parameter at each of the points of the stencil S in the Fourier representation.

A Simulation Method Using Directional Discretizations with the Flux Vector Distribution Method and Fourier Components.

Another Distribution method is the Flux Vector Distribution method. Here, the representation of the unknowns is the same as for the Residual Distribution method, but now the flux $f$ through surfaces of volumes are split into parts $\alpha_i f$ which are distributed over the nodes i. The approximated value $D_p^A = D_p^{\alpha_i}$ is expressed in the nodal unknowns $u_s$ at a collection of points, called stencil S. In the approximated value $D_p^{\alpha_i}$, the distribution computational coefficients $\alpha_i$ are then chosen in such a way that the Fourier components are optimized for certain directions which are related to the velocity $\vec{a}$, while using the value $u_s$ of the parameter at each of the points of the stencil S in the Fourier representation.

A Simulation Method Using Directional Discretizations On Orthogonal Curvilinear Coordinate Systems.

The most commonly used curvilinear coordinate systems are orthogonal, such as: rectangular coordinates (also called rectilinear coordinates), spherical coordinates, cylindrical coordinates, parabolic cylindrical coordinates, paraboloidal coordinates, elliptic cylindrical coordinates, prolate spheroidal coordinates, oblate spheroidal coordinates, bipolar coordinates, toroidal coordinates, conical coordinates, confocal ellipsoidal coordinates or confocal paraboloidal coordinates, see (D5) "Mathematical Handbook", Murray R. Spiegel, McGraw-Hill, New York, 1968. The above directional discretizations can be used therefore in those coordinate systems, where the expression of nodal values u in a truncated Taylor series expansion, and the transformation to the local coordinate system $B(\vec{e}_1, \vec{e}_2, \vec{e}_3, \ldots)$, as well as the Fourier representation and other numerical properties depend on the specifics of the structured grid which is used.

A Simulation Method Using Directional Discretizations On a Wide Variety Of Grids.

The invention can be applied to the most basic grids with uniform mesh spacing which are fixed in space, but equally to grids which have non-uniform mesh spacing, which are moving, which are deforming, which are rotating, which are staggered, and any combination thereof.

A Simulation Method Using Directional Discretizations In Rectilinear Coordinate Systems.

The above directional discretizations can be used in rectilinear coordinate systems. In the case of regular rectangular coordinates, the expression of nodal values u in a truncated Taylor series means that for a certain point $u_s$ with indices $(l, m, n, \ldots)$, $$u_{l,m,n,\ldots} = u_{i,j,k,\ldots} + \sum_{r=1}^{r_{max}} \frac{1}{r!} \left( (l-i)\Delta x \frac{\partial}{\partial x} + (m-j)\Delta y \frac{\partial}{\partial y} + (n-k)\Delta z \frac{\partial}{\partial z} + \ldots \right)^r u, \quad (4)$$

where the error in $u_{l,m,n}, \ldots$ depends on the last term in the series, which is determined by the upper limit in the summation, $r_{max}$. A term of the form $(q1+q2+q3+\ldots)^T$ can be written as $$(q_1 + q_2 + q_3 + \ldots)^r = \sum_{n_1,n_2,n_3,\ldots} \frac{r!}{n_1! n_2! n_3! \ldots} q_1^{n_1} q_2^{n_2} q_3^{n_3} \ldots , \quad (5)$$

where the sum is over all nonnegative integers $n_1$, $n_2$, $n_3$, ... for which $n_1+n_2+n_3+ \ldots r$, see D5.

The partial derivatives appearing in the truncated Taylor series expansions can be rewritten in derivatives of the local basis B using the coordinate transformation $$x = t_{1,1} e_1 + t_{1,2} e_2 + t_{1,3} e_3 + \ldots \quad (6)$$
$$y = t_{2,1} e_1 + t_{2,2} e_2 + t_{2,3} e_3 + \ldots$$
$$z = t_{3,1} e_1 + t_{3,2} e_2 + t_{3,3} e_3 + \ldots$$
$$\vdots \quad \vdots \quad \vdots \quad \vdots \quad \ddots ,$$

where the coefficients $t_{\alpha,\beta}$ depend on the angles between the two coordinate systems.

A Simulation Method Using Directional Discretizations for Pure Derivatives.

A special case of the above space discretizations is obtained for pure derivatives, $\partial^p u/\partial e_i^p$ for certain i and p. These are first and higher pure derivatives. For $i=1$, they are along the preferential direction. The computational functions are chosen in such a way that the approximated value $D_p^A$ is optimized for the preferential direction.

A Simulation Method Using Directional Discretizations for the First Derivative.

A special case of the above space discretizations is obtained for $p=1$, which refers to the first derivatives, which are also called gradients. These derivatives are the building block for any numerical simulation of advection phenomena.

A Simulation Method Using Directional Discretizations for the Second Derivative.

A special case of the above space discretizations is obtained for $p=2$, which refers to the second derivatives. Second derivatives appear in the discretization of viscous terms, or in a purely numerical fashion as artificial viscosities. These derivatives are the building block for any numerical simulation including viscosity.

A Simulation Method Using Directional Discretizations for Mixed Derivatives.

A special case of the above space discretizations is obtained for mixed derivatives, $\partial^p u/\partial e_1^{p_1} \partial e_2^{p_2} \ldots$ with $p_1 + p_2 + \ldots = p$. The computational functions are chosen in such a way that said approximated value $D_p^A$ is optimized for the preferential direction.

A Simulation Method Using Directional Discretizations for the First Derivative $D_1 = \partial u/\partial e_1$ Using Points On Diagonals.

A special case of the above directional discretizations is using the approximation given by $$\begin{pmatrix} (u_x)_{i,j,k,\ldots} \\ (u_y)_{i,j,k,\ldots} \\ (u_z)_{i,j,k,\ldots} \\ \vdots \end{pmatrix}, \quad (7)$$

wherein $$(u_x)_{i,j,k,\ldots} = \frac{1}{\Delta x} \{ a_{-m} u_{i-m,j,k,\ldots} + a_{-m+1} u_{i-m+1,j,k,\ldots} + \ldots + \quad (8)$$
$$a_{n-1} u_{i+n-1,j,k,\ldots} + a_n u_{i+n,j,k,\ldots} + Tx \},$$

$$(u_y)_{i,j,k,\ldots} = \frac{1}{\Delta y} \{ a_{-m} (u_{i-m,j-m,k,\ldots} - u_{i-m,j,k,\ldots}) +$$
$$a_{-m+1} (u_{i-m+1,j-m+1,k,\ldots} - u_{i-m+1,j,k,\ldots}) + \ldots +$$
$$a_{n-1} (u_{i+n-1,j+n-1,k,\ldots} - u_{i+n-1,j,k,\ldots}) +$$

-continued $$a_n(u_{i+n,j+n,k,\ldots} - u_{i+n,j,k,\ldots}) + Ty\},$$

$$(u_z)_{i,j,k,\ldots} = \frac{1}{\Delta z}\{a_{-m}(u_{i-m,j-m,k-m,\ldots} - u_{i-m,j-m,k,\ldots}) +$$

$$a_{-m+1}(u_{i-m+1,j-m+1,k-m+1,\ldots} - u_{i-m+1,j-m+1,k,\ldots}) + \ldots +$$

$$a_{n-1}(u_{i+n-1,j+n-1,k+n-1,\ldots} - u_{i+n-1,j+n-1,k,\ldots}) +$$

$$a_n(u_{i+n,j+n,k+n,\ldots} - u_{i+n,j+n,k,\ldots}) + Tz\},$$

wherein $a_{-m} \neq 0$, $a_n \neq 0$, m and n are given integers, m+n>0, and m+n>1 if m*n=0, the terms Tx, Ty, Tz, . . . represent the degrees of freedom which are used in the optimization of said approximated value $D_1^A$, and where indices (i, j, k, . . . ) define the point of computation P on the N-dimensional grid, and $\Delta x$, $\Delta y$, $\Delta z$, . . . denote the mesh spacings of the N-dimensional grid in each coordinate direction.

The combination of the first derivatives of equations 7 is also called gradient in N dimensions.

Without the terms Tx, Ty, Tz, . . . , this approximation amounts to using a one-dimensional discretization for the x-derivative. This is normally a consistent approximation to a first derivative, with numerical properties such as the desired order. Then, the same one-dimensional discretization is applied to the diagonal nodes in the x-y-plane to obtain the sum of the x and y derivatives, from which the y derivative follows. This construction is applied consequently for each additional space dimension. This approximation has therefore a reduced error when the preferential direction a is directed along the x-axis, and along certain diagonals of the grid. Remark that when m and n are of opposite sign, the stencil does not contain the point of computation P. For m and n positive or zero, P is part of the stencil, but appears only in the x-derivative.

With the terms Tx, Ty, Tz, . . . included, all the consistent approximations on the grid with an extent of (−m . . . n) in each grid direction can be found, as explained before. The terms T, which represent the degrees of freedom in the form of stencils with a multiplying coefficient, can be used for any optimization.

This discretization has a reduced error for preferential directions with a≧b≧c≧ . . . ≧0, and permutations thereof for other directions, but the discretization can be applied to other preferential directions.

As mentioned before, the stencils corresponding to the degrees of freedom, indicated by T, can be chosen in such a way that the approximation depends continuously on the preferential direction. Without the terms T, the discretization is already continuous.

As an example, consider the case m=n=1, $a_1=\frac{1}{2}$, $a_0=0$ and $a_{-1}=-\frac{1}{2}$ in three dimensions, and take for simplicity the point P at the origin, which means i=j=k=0. These values substituted in equations 8 result in the second order directional central discretization, which is given by $$(u_x)_{0,0,0} = \frac{1}{\Delta x}\left\{\frac{1}{2}(u_{1,0,0} - u_{-1,0,0}) + Tx\right\}, \quad (9)$$

$$(u_y)_{0,0,0} = \frac{1}{\Delta y}\left\{\frac{1}{2}(u_{1,1,0} - u_{1,0,0} + u_{-1,0,0} - u_{-1,-1,0}) + Ty\right\},$$

$$(u_z)_{0,0,0} = \frac{1}{\Delta z}\left\{\frac{1}{2}(u_{1,1,1} - u_{1,1,0} + u_{-1,-1,0} - u_{-1,-1,-1}) + Tz\right\}.$$

Figure 4:
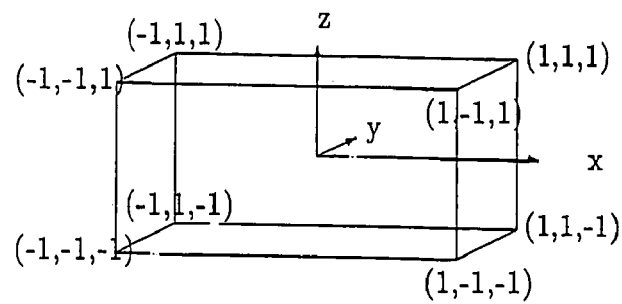
FIG. 4: Perspective view of a part of a grid around the origin, showing the coordinate axes emanating from the origin, the 8 corner nodes and the edges of a cube.

A permutation of this stencil is given in FIG. 3. If the x-axis is taken parallel to the direction given by nodes 1 and 2, the y-axis is taken parallel to the direction given by nodes 3 and 4 and the z-axis is taken parallel to the direction given by nodes 5 and 6, the x-derivative involves the nodes 1 and 2, the y-derivative involves the nodes 7, 2, 1 and 9, and the z-derivative involves the nodes 8, 7, 9 and 10. The stencil of this discretization fits in the cube shown in FIG. 4. FIG. 4 shows the coordinate system as well as eight corner points on a grid ranging from −1 to 1 in all directions, defining a cube. The origin is at the intersection of the three axes.

In the appendices 1-5, the listing of a program is given which computes in a systematic way approximations in three dimensions. The user defines in an input file the derivative to be approximated, the order of accuracy and the maximum extent of the stencils. The program is used with this specification to generate all possible stencils which satisfy these constraints. The resulting stencils are in the form like presented in equations 8, a stencil which satisfies the constraints and terms T which represent stencils which can be added without violating the constraints. The terms T can be added since they appear in the discretization in the leading error term. The terms T form a basis of stencils with which all stencils can be formed which satisfy the constraints. Also an optimization parameter needs to be given to the program which computes discretizations. Without optimization, all the stencils giving a consistent approximation are generated, which can then be used for consequent optimization. One particular optimization which is coded reduces the approximation to a pure one-dimensional discretization when the preferential direction is along the x-axis or along diagonals. This optimization therefore reduces the number of degrees of freedom.

For the latter optimization, the computer-generated images using the results of the program as presented in appendix 8 are shown in FIGS. 5-17 for a second order approximation to a first derivative $D_1 = \partial u/\partial e_1 = \vec{e}_1 \cdot \vec{\nabla} u$ on a stencil which does not exceed the cube of FIG. 4. The optimization has left ten degrees of freedom for each grid-based derivative, which is a reduction from the 17 degrees of freedom without optimization, see appendix 6.

Figure 5:
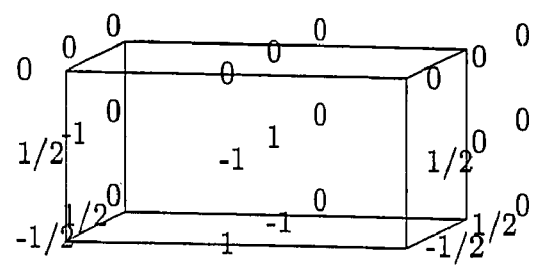
FIG. 5: Perspective view of a part of a grid around the origin, indicating at the 27 nodes of the grid the weights computed by the program described in the appendices for the derivative $(u_x)_{0,0,0}$ used in a second order approximation to a first derivative $D_1 = \partial u/\partial e_1$ on a stencil which does not exceed the cube of FIG. 4.
Figure 6:
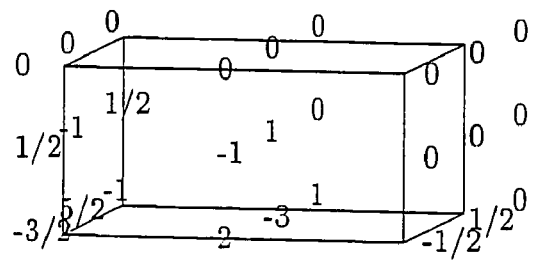
FIG. 6: Perspective view of a part of a grid around the origin, indicating at the 27 nodes of the grid the weights computed by the program described in the appendices for the derivative $(u_y)_{0,0,0}$ used in a second order approximation to a first derivative $D_1 = \partial u/\partial e_1$ on a stencil which does not exceed the cube of FIG. 4.
Figure 7:
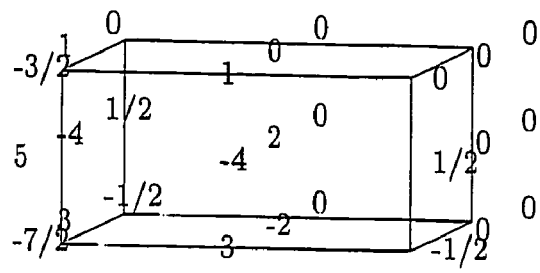
FIG. 7: Perspective view of a part of a grid around the origin, indicating at the 27 nodes of the grid the weights computed by the program described in the appendices for the derivative $(u_z)_{0,0,0}$ used in a second order approximation to a first derivative $D_1 = \partial u/\partial e_1$ on a stencil which does not exceed the cube of FIG. 4.
Figure 8:
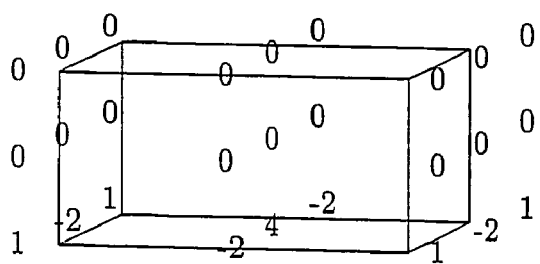
FIG. 8: Perspective view of a part of a grid around the origin, showing the result of the degrees of freedom in the approximation of a first derivative $D_1 = \partial u/\partial e_1$ on a stencil which does not exceed the cube of FIG. 4, in set 1 of weights at the 27 nodes of the grid as computed by the program described in the appendices.

The meaning of these figures is as follows. In FIGS. 5, 6 and 7, the stencils T$f$x, T$f$y and T$f$z of appendix 8 are shown which are used in the approximation of $(u_z)_{0,0,0}$, $(u_y)_{0,0,0}$ and $(u_z)_{0,0,0}$ respectively, which corresponds to $$(u_x)_{0,0,0} = \frac{1}{2\Delta x}(2u_{0,0,0} - 2u_{-1,0,0} + u_{1,-1,0} - 2u_{0,-1,0} + \quad (10)$$

$$u_{-1,-1,0} + u_{1,0,-1} - 2u_{0,0,-1} + u_{-1,0,-1} -$$

$$u_{1,-1,-1} + 2u_{0,-1,-1} - u_{-1,-1,-1}),$$

$$(u_y)_{0,0,0} = \frac{1}{2\Delta y}(2u_{0,0,0} - 2u_{-1,0,0} + u_{-1,1,0} - 2u_{0,-1,0} + u_{-1,-1,0} +$$

$$2u_{0,1,-1} - 2u_{-1,1,-1} + u_{1,0,-1} - 6u_{0,0,-1} +$$

$$5u_{-1,0,-1} - u_{1,-1,-1} + 4u_{0,-1,-1} - 3u_{-1,-1,-1}),$$

$$(u_z)_{0,0,0} = \frac{1}{2\Delta z}(2u_{-1,0,1} + 2u_{0,-1,1} - 3u_{-1,-1,1} +$$

$$u_{-1,1,0} + 4u_{0,0,0} - 8u_{-1,0,0} +$$

$$u_{1,-1,0} - 8u_{0,-1,0} + 10u_{-1,-1,0} -$$

$$u_{-1,1,-1} - 4u_{0,0,-1} + 6u_{-1,0,-1} -$$

$$u_{1,-1,-1} + 6u_{0,-1,-1} - 7u_{-1,-1,-1}).$$

This combination is a directional second order approximation to $D_1 = \partial u/\partial e_1$. While this approximation is different from the one given in equations 9, the relation between them is supplied by the terms Tx, Ty and Tz. The degrees of freedom described by the terms Tx, Ty and Tz in equation 9 correspond, among others, to the weights shown in FIGS. 8-17. These figures are computer-generated images using the output from appendix 8 of the program described in the appendices 1-5. Except for a factor containing the grid spacings, each of these sets of weights is an approximation to a derivative, on a stencil which is the set of the points with a non-zero weight. In the present example, these are all approximations to combinations of various mixed fourth derivatives. Since these approximations appear only in the third order error term of the approximation to $D_1$, they can be added ad libitum without deteriorating the optimization of the second order approximation.

Figure 9:
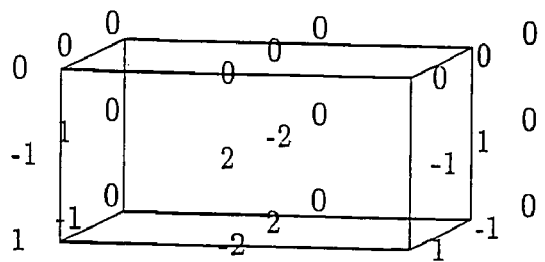
FIG. 9: Perspective view of a part of a grid around the origin, showing the result of the degrees of freedom in the approximation of a first derivative $D_1 = \partial u/\partial e_1$ on a stencil which does not exceed the cube of FIG. 4, in set 2 of weights at the 27 nodes of the grid as computed by the program described in the appendices.
Figure 10:
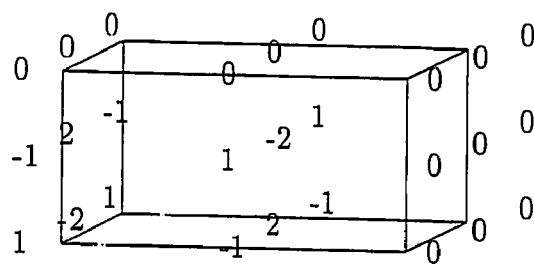
FIG. 10: Perspective view of a part of a grid around the origin, showing the result of the degrees of freedom in the approximation of a first derivative $D_1 = \partial u/\partial e_1$ on a stencil which does not exceed the cube of FIG. 4, in set 3 of weights at the 27 nodes of the grid as computed by the program described in the appendices.
Figure 11:
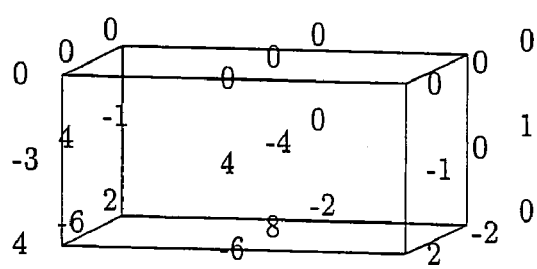
FIG. 11: Perspective view of a part of a grid around the origin, showing the result of the degrees of freedom in the approximation of a first derivative $D_1 = \partial u/\partial e_1$ on a stencil which does not exceed the cube of FIG. 4, in set 4 of weights at the 27 nodes of the grid as computed by the program described in the appendices.
Figure 12:
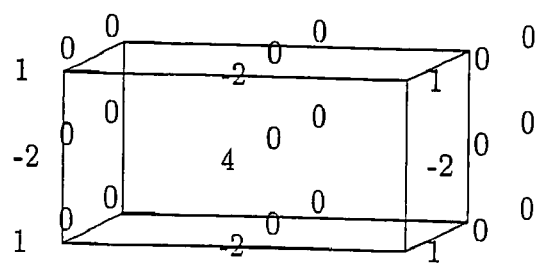
FIG. 12: Perspective view of a part of a grid around the origin, showing the result of the degrees of freedom in the approximation of a first derivative $D_1 = \partial u/\partial e_1$ on a stencil which does not exceed the cube of FIG. 4, in set 5 of weights at the 27 nodes of the grid as computed by the program described in the appendices.
Figure 13:
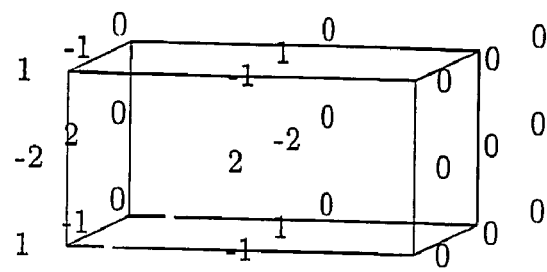
FIG. 13: Perspective view of a part of a grid around the origin, showing the result of the degrees of freedom in the approximation of a first derivative $D_1 = \partial u/\partial e_1$ on a stencil which does not exceed the cube of FIG. 4, in set 6 of weights at the 27 nodes of the grid as computed by the program described in the appendices.
Figure 14:
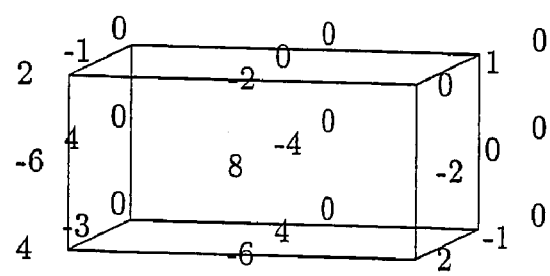
FIG. 14: Perspective view of a part of a grid around the origin, showing the result of the degrees of freedom in the approximation of a first derivative $D_1 = \partial u/\partial e_1$ on a stencil which does not exceed the cube of FIG. 4, in set 7 of weights at the 27 nodes of the grid as computed by the program described in the appendices.
Figure 15:
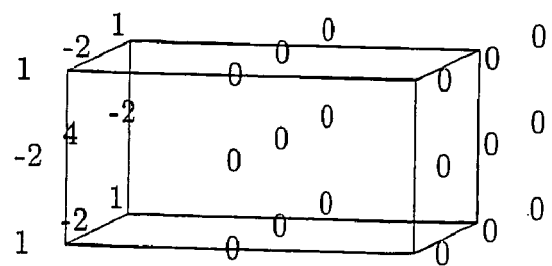
FIG. 15: Perspective view of a part of a grid around the origin, showing the result of the degrees of freedom in the approximation of a first derivative $D_1 = \partial u/\partial e_1$ on a stencil which does not exceed the cube of FIG. 4, in set 8 of weights at the 27 nodes of the grid as computed by the program described in the appendices.
Figure 16:
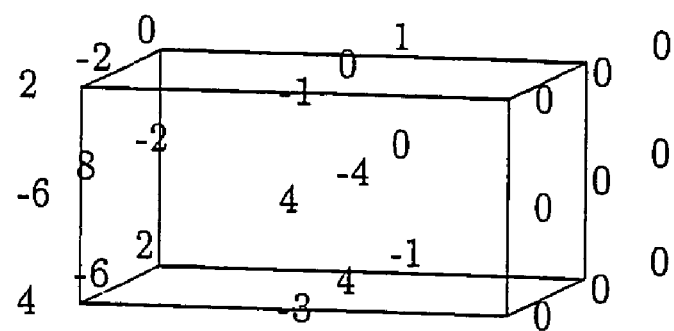
FIG. 16: Perspective view of a part of a grid around the origin, showing the result of the degrees of freedom in the approximation of a first derivative $D_1 = \partial u/\partial e_1$ on a stencil which does not exceed the cube of FIG. 4, in set 9 of weights at the 27 nodes of the grid as computed by the program described in the appendices.
Figure 17:
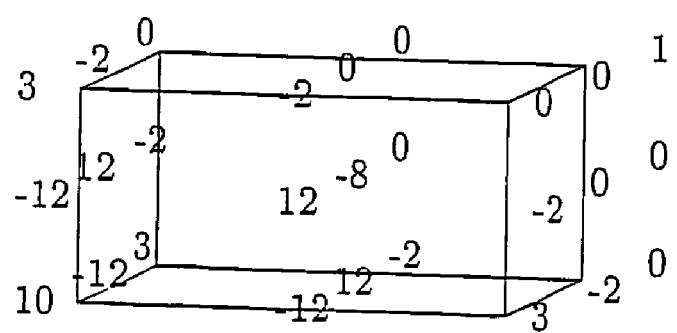
FIG. 17: Perspective view of a part of a grid around the origin, showing the result of the degrees of freedom in the approximation of a first derivative $D_1 = \partial u/\partial e_1$ on a stencil which does not exceed the cube of FIG. 4, in set 10 of weights at the 27 nodes of the grid as computed by the program described in the appendices.

The derivative $(u_x)_{0,0,0}$ of equations 9 can be obtained by taking the derivative $(u_x)_{0,0,0}$ of equations 10 to which is added half the approximation of FIG. 9. The derivative $(u_y)_{0,0,0}$ of equations 9 can be obtained by taking the derivative $(u_y)_{0,0,0}$ of equations 10 to which is added half the approximation of FIG. 11 and subtracted half the approximation of FIG. 9. The derivative $(u_z)_{0,0,0}$ of equations 9 can be obtained by taking the derivative $(u_z)_{0,0,0}$ of equations 10 to which is added half the approximation of FIG. 17 and subtracted half the approximation of FIG. 11.

Remark that in the present example the degrees of freedom translated into approximations which were invisible at the level of the leading error of the directional approximation. Also, the stencils related to the degrees of freedom are the same for each of the grid-based derivatives. This is not the case in general. Degrees of freedom normally result in approximations with the same order of accuracy as the leading error of the directional approximation. Here, it is the restrictive condition which is imposed on the error of the approximation which results in combinations of stencils of third derivatives which are effectively fourth derivatives. Also, for some optimizations for approximations to derivatives, the degrees of freedom in the different grid-based approximations are coupled. This means that e.g. Ty and Tz contain a coefficient which appears in both the $u_y$ and $u_z$ discretizations in such a way that their effect is annihilated for the specific directions along which the optimization takes place. It is also to be noted that adding an adirectional discretization of sufficiently high order to the approximation of the directional derivative does not harm the directional properties. Finally, taking into account degrees of freedom allowing larger stencils, e.g. larger than the domain indicated in FIG. 4 in the above example, effectively results in an unlimited number of degrees of freedom, and an unlimited number of discretizations which can be added.

The degrees of freedom which are represented by the terms Tx, Ty and Tz, some of which are illustrated in FIGS. 8 to 17, offer an opportunity for further tuning of the approximation, especially in the case that the degrees of freedom correspond to approximations of sufficient low order. The use of an extended stencil with points off the coordinate lines open a vast area of optimization, e.g. in the Fourier domain for improved convergence. These newly found degrees of freedom are a crucial part of the invention. Other examples of the degrees of freedom are given further on.

As mentioned, the program given in the appendices is capable to find the terms Tx, Ty and Tz. When adding an elementary post-processing routine, it is possible to relate two different approximations using the different degrees of freedom, just as shown above between equations 9 and 10.

The stencils indicated by the terms T represent a basis of discretizations. As with any basis, transformations to another basis is possible. Linear combinations of these stencils form another basis, and other bases can be expressed in the terms T. It is therefore to be understood that the terms T are just one representation, and that any transformation to other stencils, linear combinations, orthogonalization, scaling, orthonormalization such as the Gramm-Schmidt orthonormalization and so on and so forth is part of the invention.

The above procedure describes the systematic construction of the discretizations of first derivatives (gradients) including degrees of freedom, which can be used directly in the Finite Difference and in the Finite Volume formulations, and which can be translated to other formulations. Some of the gradients are described below, but the scope of the invention is not limited to those.

A Simulation Method Using Directional Discretizations for the First Derivative $D_1 = \partial u / \partial e_1$ Of Order M and Eliminating the Terms $\partial^{M+1} \partial u / \partial e_2^{M_2} \partial e_3^{M_3}$ . . . with $M_2 + M_3 + \ldots = M+1$.

The above method using a local basis B ($\vec{e}_1$, $\vec{e}_2$, $\vec{e}_3$, . . . ) of curvilinear coordinates which has the unit vector $\vec{e}_1$ along the preferential direction. The optimization is such that the terms $\partial^{M+1} u / \partial e_2^{M_2} \partial e_3^{M_3}$ . . . with $M_2 + M_3 + \ldots = M+1$ are eliminated in the approximated value $D_1^A$.

When approximating the derivative $D_1 = \partial u / \partial e_1$ with a discretization which has an error of order M, the error term contains in general contributions $\partial^{M+1} u / \partial e_1^{M_1} \partial e_2^{M_2} \partial e_3^{M_3}$ . . . with $M_1 + M_2 + M_3 + \ldots = M+1$. It is advantageous to eliminate the error components which are normal to the preferential direction, which are the terms $\partial^{M+1} u / \partial e_2^{M_2} \partial e_3^{M_3}$ . . . with $M_2 + M_3 + \ldots = M+1$. This is always possible with the proper choice of the terms T, where the terms T are taken constant or where they depend e.g. on the flow angles.

A Simulation Method Using Directional Discretizations for the First Derivative $D_1 = \partial u / \partial e_1$ Of Order M and Eliminating the Terms $\partial^{M+1} u / \partial e_1^{M_1} \partial e_2^{M_2} e_3^{M_3}$ . . . with $M_1 + M_2 + M_3 + . = M+1$ and $M_1 < M+1$.

The above method using a local basis B($\vec{e}_1$, $\vec{e}_2$, $\vec{e}_3$, . . . ) of curvilinear coordinates which has the unit vector $\vec{e}_1$ along the preferential direction. The optimization is such that the terms $\partial^{M+1} u / \partial e_1^{M_1} \partial e_2^{M_2} e_3^{M_3}$ . . . with $M_1 + M_2 + M_3 + \ldots = M+1$ and $M_1 < M+1$ are eliminated in the approximated value $D_1^A$ in the case that $\vec{e}_1$ is along the x-axis or along diagonals.

This is an optimization of the approximation which reduces the discretization to a one-dimensional discretization along the x-axis and along diagonals. This discretization has a reduced error for preferential directions with $a \geq b \geq c \geq \ldots \geq 0$, and permutations thereof for other directions, but the discretization can be applied to other preferential directions.

A Simulation Method Using a Second Order Directional Discretization for the First Derivative.

A simulation method which provides a simulated numerical representation which uses a second order directional discretization in N dimensions, $N \geq 3$, on a structured grid, for the approximation of $D_1$ derivatives with a reduced error is given by $$\begin{pmatrix} (u_x)_{i,j,k,\ldots} \\ (u_y)_{i,j,k,\ldots} \\ (u_z)_{i,j,k,\ldots} \\ \vdots \end{pmatrix}, \tag{11}$$

wherein $$(u_x)_{i,j,k,\ldots} = \frac{1}{\Delta x}\left\{\frac{1}{2}(u_{i+1,j,k,\ldots} - u_{i-1,j,k,\ldots}) + Tx\right\}, \tag{12}$$

$$(u_y)_{i,j,k,\ldots} = \frac{1}{\Delta y}\left\{\frac{1}{2}(u_{i+1,j+1,k,\ldots} - u_{i+1,j,k,\ldots} + u_{i-1,j,k,\ldots} - u_{i-1,j-1,k,\ldots}) + Ty\right\},$$

$$(u_z)_{i,j,k,\ldots} = \frac{1}{\Delta z}\left\{\frac{1}{2}(u_{i+1,j+1,k+1,\ldots} - u_{i+1,j+1,k,\ldots} + u_{i-1,j-1,k,\ldots} - u_{i-1,j-1,k-1,\ldots}) + Tz\right\},$$

$$\vdots$$

This discretization is a special case of the discretization of equation 8, with m=n=1, $$a_1 = \frac{1}{2},$$

$a_0 = 0$ and $$a_{-1} = -\frac{1}{2}.$$

The terms Tx, Ty, Tz, ... represent the degrees of freedom which are used in the optimization of said approximated value $D_1^A$, and where indices (i, j, k, ... ) define the point of computation P on the N-dimensional grid, and Δx, Δy, Δz, ... denote the mesh spacings of the N-dimensional grid in each coordinate direction.

This discretization has a reduced error for preferential directions with a≧b≧c≧ ... ≧0, and permutations thereof for other directions, but the discretization can be applied to other preferential directions.

An example in three dimensions has been discussed above.

A Simulation Method Using a Fourth Order Directional Discretization for the First Derivative.

A simulation method which provides a simulated numerical representation which uses a fourth order directional discretization for the approximation of $D_1$ derivatives in N dimensions, N≧3, on a structured grid with a reduced error is given by $$\begin{pmatrix} (u_x)_{i,j,k,\ldots} \\ (u_y)_{i,j,k,\ldots} \\ (u_z)_{i,j,k,\ldots} \\ \vdots \end{pmatrix}, \tag{13}$$

wherein $$(u_x)_{i,j,k,\ldots} = \tag{14}$$

$$\frac{1}{\Delta x}\left\{\frac{1}{12}(u_{i-2,j,k,\ldots} - 8u_{i-1,j,k,\ldots} + 8u_{i+1,j,k,\ldots} - u_{i+2,j,k,\ldots}) + Tx\right\},$$

$$(u_y)_{i,j,k,\ldots} =$$

-continued $$\frac{1}{\Delta y}\left\{\frac{1}{12}(u_{i-2,j-2k,\ldots} - u_{i-2,j,k,\ldots} - 8u_{i-1,j-1,k,\ldots} + 8u_{i-1,j,k,\ldots} + \right.$$

$$8u_{i+1,j+1,k,\ldots} - 8u_{i+1,j,k,\ldots} -$$

$$\left. u_{i+2,j+2,k,\ldots} + u_{i+2,j,k,\ldots}) + Ty\right\},$$

$$(u_z)_{i,j,k,\ldots} = \frac{1}{\Delta z}\left\{\frac{1}{12}(u_{i-2,j-2k-2,\ldots} - u_{i-2,j-2,k,\ldots} - 8u_{i-1,j-1,k-1,\ldots} + \right.$$

$$8u_{i-1,j-1,k,\ldots} + 8u_{i+1,j+1,k+1,\ldots} - 8u_{i+1,j+1,k,\ldots} -$$

$$\left. u_{i+2,j+2,k+2,\ldots} + u_{i+2,j+2,k,\ldots}) + Tz\right\},$$

This discretization is a special case of the discretization of equation 8, with m=n=2, $$a_{-2} = \frac{1}{12},$$

$$a_{-1} = -\frac{8}{12},$$

$$a_0 = 0,$$

$$a_1 = \frac{8}{12}$$

and $$a_2 = -\frac{1}{12}.$$

The terms Tx, Ty, Tz, ... represent the degrees of freedom which are used in the optimization of said approximated value $D_1^A$, and where indices (i, j, k, ... ) define the point of computation P on the N-dimensional grid, and Δx, Δy, Δz, ... denote the mesh spacings of the N-dimensional grid in each coordinate direction.

This discretization has a reduced error for preferential directions with a≧b≧c≧ ... ≧0, and permutations thereof for other directions, but the discretization can be applied to other preferential directions.

A Simulation Method Using a Second Order Directional Upwind Discretization for the First Derivative.

A simulation method which provides a simulated numerical representation which uses a second order directional upwind discretization for the approximation of $D_1$ derivatives in N dimensions, $N \geq 3$, on a structured grid with a reduced error is given by $$\begin{pmatrix} (u_x)_{i,j,k,\ldots} \\ (u_y)_{i,j,k,\ldots} \\ (u_z)_{i,j,k,\ldots} \\ \vdots \end{pmatrix}, \quad (15)$$

wherein $$(u_x)_{i,j,k,\ldots} = \frac{1}{\Delta x}\left(\frac{3}{2}u_{i,j,k,\ldots} - 2u_{i-1,j,k,\ldots} + \frac{1}{2}u_{i-2,j,k,\ldots} + Tx\right), \quad (16)$$

$$(u_y)_{i,j,k,\ldots} =$$
$$\frac{1}{\Delta y}\left(-2(u_{i-1,j-1,k,\ldots} - u_{i-1,j,k,\ldots}) + \frac{1}{2}(u_{i-2,j-2,k,\ldots} - u_{i-2,j,k,\ldots}) + Ty\right),$$

$$(u_z)_{i,j,k,\ldots} = \frac{1}{\Delta z}\Big(-2(u_{i-1,j-1,k-1,\ldots} - u_{i-1,j-1,k,\ldots}) +$$
$$\frac{1}{2}(u_{i-2,j-2,k-2,\ldots} - u_{i-2,j-2,k,\ldots}) + Tz\Big),$$

This discretization is a special case of the discretization of equation 8, with m=2, $$n = 0,$$
$$a_0 = \frac{3}{2},$$
$$a_{-1} = -2,$$
and
$$a_{-2} = \frac{1}{2}.$$

The terms $Tx, Ty, Tz, \ldots$ represent the degrees of freedom which are used in the optimization of said approximated value DA, and where indices $(i, j, k, \ldots)$ define the point of computation P on the N-dimensional grid, and $\Delta x, \Delta y, \Delta z, \ldots$ denote the mesh spacings of the N-dimensional grid in each coordinate direction.

A Simulation Method Using Discretizations Obtained by a Computer Program.

A simulation method which provides a simulated numerical representation in three dimensions wherein the approximation $D_p^A$ with order M of the derivative $Dp = \partial^p u/\partial e_1^{p_1} \partial e_2^{p_2} \partial e_3^{p_3}$ with $p_1+p_2+p_3=p$ on a grid of given extent is obtained from the output of the program generate-discretizations which is given in appendices 1-5.

This program has been mentioned before. The program generates the grid-based approximations used in the discretization of the derivative $D_p = \partial^p u/\partial e_1^{p_1} \partial e_2^{p_2} \partial e_3^{p_3}$ with $p_1+p_2+p_3=p$ with order M on a grid of given extent. An optimization parameter optimize controls which type of optimization of $D_p^A$ is generated.

A description of the input parameters and its use can be found in the listings in appendices 1-5.

For optimize=0, the program generates the basis of stencils resulting in a consistent approximation of $D_p^A$. The user can then use this basis to optimize $D_p^A$ as desired. Any of the discretizations of the invention in three dimension in the Finite Difference formulation can be expressed in this basis, and therefore, any basis obtained with optimize=0 represents the essence of the invention. The extension to other formulations or to more dimensions is trivial.

Figure 18:
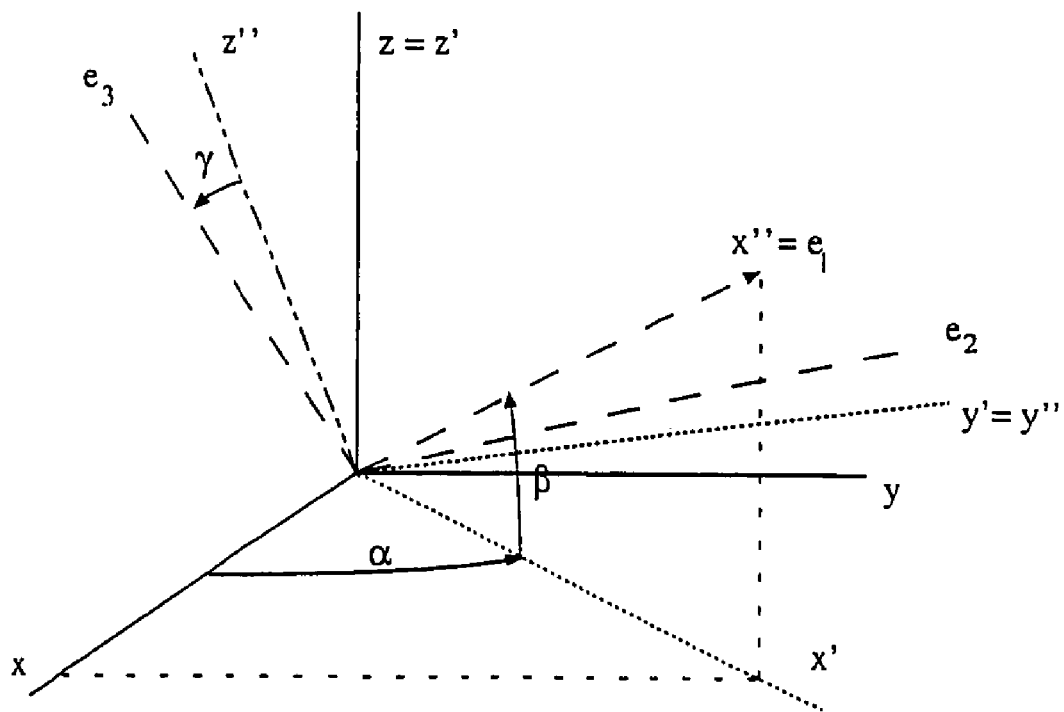
FIG. 18: Perspective view of the three rotations with angles $\alpha$, $\beta$ and $\gamma$ linking the grid with the axes of the local basis B.

The rotations which have been used in the axes transformation, equation 6, are the following. It takes two successive rotations to link the $e_1$-axis of the local basis B with the fixed axes. The first is in the grid basis G around the z-axis with angle $\alpha$, resulting in the axis system A'(x', y', z') with z'=z. This is followed by a rotation around the y'-axis with angle $\beta$, as shown in FIG. 18. The axis system is A"(x", y", z"), with y"=y'. Another rotation with angle $\gamma$ around the x"=$e_1$-axis positions the $e_2$ and $e_3$ axes, giving the directional axis system of the local basis B. The rotations are given by their matrices, $\vec{x} = M_\alpha \vec{x}'$, $\vec{x}' = M_\beta \vec{x}''$ and $\vec{x}'' = M_\gamma \vec{e}$, $$M_\alpha = \begin{pmatrix} \cos\alpha & -\sin\alpha & 0 \\ \sin\alpha & \cos\alpha & 0 \\ 0 & 0 & 1 \end{pmatrix}, \quad (17)$$

$$M_\beta = \begin{pmatrix} \cos\beta & 0 & -\sin\beta \\ 0 & 1 & 0 \\ \sin\beta & 0 & \cos\beta \end{pmatrix},$$

$$M_\gamma = \begin{pmatrix} 1 & 0 & 0 \\ 0 & \cos\gamma & -\sin\gamma \\ 0 & \sin\gamma & \cos\gamma \end{pmatrix}$$

and the transformation $\vec{x} = M\vec{e} = M_\alpha M_\beta M_\gamma \vec{e}$ is defined by $$M = \begin{pmatrix} \cos\alpha\cos\beta & -\sin\alpha\cos\gamma + \cos\alpha\sin\beta\sin\gamma & -\sin\alpha\sin\gamma - \cos\alpha\sin\beta\cos\gamma \\ \sin\alpha\cos\beta & \cos\alpha\cos\gamma + \sin\alpha\sin\beta\sin\gamma & \cos\alpha\sin\gamma - \sin\alpha\sin\beta\cos\gamma \\ \sin\beta & -\cos\beta\sin\gamma & \cos\beta\cos\gamma \end{pmatrix}. \quad (18)$$

The inverse of M, $M^{-1}=M^T$, is used in $\vec{e} = M^{-1}\vec{x}$, and in the expression for the derivative along $e_1$, $$\frac{\partial u}{\partial e_1} = \cos\alpha\cos\beta \frac{\partial u}{\partial z} + \sin\alpha\cos\beta \frac{\partial u}{\partial y} + \sin\beta \frac{\partial u}{\partial z}, \quad (19)$$

a transformation which only involves the angles $\alpha$ and $\beta$. In the listing of the program in the appendices, the choice $\gamma=0$ is coded and active, but the more general choice of $\gamma$ is also coded, and can easily be activated by uncommenting the appropriate lines of code.

The above choice of rotations has the advantage of resulting in a very simple transformation. Of course, other choices of rotations are possible, and the above is not meant to exclude any of the other transformations from the invention.

With the above choice of transformation, in three dimensions, the continuity of the approximation with respect to changing flow directions imposes the following symmetries:

1. Flow in the z=0 plane, $\beta=0$. Then, $\partial u/\partial e_1 = \cos\alpha \partial u/\partial x + \sin\alpha \partial u/\partial y$. The stencil should have mirror symmetry with respect to the z=0 plane.
2. Flow in the x=y plane, $\alpha=\pi/4$ and $\partial u/\partial e_1 = 1/2\sqrt(2)\cos\beta(\partial u/\partial x + \partial u/\partial y) + \sin\beta \partial u/\partial z$. The stencil should have mirror symmetry with respect to the plane x=y.
3. Flow in the y=z plane, $\beta=\arctan(\sin(\alpha))$ with $\partial u/\partial e^1 = (1+\sin^2\alpha)^{-1/2}[\cos\alpha \partial u/\partial x + \sin\alpha(\partial u/\partial y + \partial u/\partial z)]$. The stencil should have mirror symmetry with respect to the plane y=z.
4. Flow along the z-axis, $\alpha=\beta=0$. Conditions 1 and 3 apply.
5. Flow along the diagonal in the x-y plane, $\alpha=\pi/4$, $\beta=0$. Conditions 1 and 2 apply.
6. Flow along the body diagonal in x-y-z space, $\alpha=\pi/4$, $\beta=\beta^*$ where $\beta^*=\arctan(1/2\sqrt(2))$. Conditions 2 and 3 apply.

In the following, a simulation method is presented, using a discretization obtained from the program described in the appendices with certain input parameters. While the examples have practical importance, they do not mean to restrict the invention, and do not intend to exclude from the invention any other combination of input parameters.

A Simulation Method Using Discretizations Obtained by the Computer Program with the Input Variable optimize=1

For optimize=1 and for a first derivative, the program generates the output just mentioned, together with the conditions which are sufficient to eliminate the terms $\partial^{M+1}u/\partial e_2^{M_2}\partial e_3^{M_3}$ with $M_2+M_3=M+1$. This means that an additional M+2 conditions are imposed. This is an optimization discussed before.

A Simulation Method Using Discretizations Obtained by the Computer Program with the Input Variable optimize=2

For optimize=2, the program generates the basis of stencils resulting in a consistent approximation of DA eliminating the terms $\partial^{M+1}u/\partial e_1^{M_1}\partial e_2^{M_2}\partial e_3^{M_3}$ with $M_1+M_2+M_3=M+1$ and $M_1<M+1$ in the case that $\vec{e}_1$ is along the x-axis or along diagonals. This optimization reduces the number of degrees of freedom. This is an optimization discussed before.

A Simulation Method Using Discretizations Obtained by the Computer Program with the Input Variable order=1

For order=1, the program generates the basis of stencils resulting in a consistent first order approximation of $D_p^A$. First order accurate discretizations can be monotone, and are important in simulations with strong gradients. Higher order discretizations will give overshoots in the approximated values. Commonly, a combination of limiting functions or limiters is used to switch the approximation near discontinuities to first order monotone discretizations. This reduces locally the order of the approximation but preserves monotonicity of the solution.

A Simulation Method Using Discretizations Obtained by the Computer Program with the Input gridmin=−1, gridmax=1, se1=1, se2=0, se3=0, order=2, optimize=0, check=0

A simulation method in three dimensions which uses the program described in the appendices 1-5, wherein the approximation $D_p^A$ is obtained from the output of the program generate-discretizations which is given in appendices 1-5 using the input parameters 1. gridmin=−1, gridmax=1,
2. se1=1, se2=0, se3=0,
3. order=2, optimize=0, check=0.

The output obtained with this input can be found in appendix 6. Remark that the 17 stencils which are associated with the degrees of freedom are the same for $u_x$, $u_y$ and $u_z$.

A Simulation Method Using Discretizations Obtained by the Computer Program with the Input gridmin=−1, gridmax=1, se1=1, se2=0, se3=0, order=2, optimize=1, check=0

A simulation method in three dimensions which uses the program described in the appendices 1-5, wherein the approximation $D_p^A$ is obtained from the output of the program generate-discretizations which is given in appendices 1-5 using the input parameters 1. gridmin=−1, gridmax=1,
2. se1=1, se2=0, se3=0,
3. order=2, optimize=1, check=0.

The output obtained with this input can be found in appendix 7. Remark that the stencils which are associated with the degrees of freedom are the same for $u_x$, $u_y$ and $u_z$. The difference with the output for optimize=1 is the four extra conditions at the end of the output.

A Simulation Method Using Discretizations Obtained by the Computer Program with the Input gridmin=−1, gridmax=1, se1=1, se2=0, se3=0, order=2, optimize=2, check=0

A simulation method in three dimensions which uses the program described in the appendices 1-5, wherein the approximation $D_p^A$ is obtained from the output of the program generate-discretizations which is given in appendices 1-5 using the input parameters 1. gridmin=−1, gridmax=1,
2. se1=1, se2=0, se3=0,
3. order=2, optimize=2, check=0.

The output obtained with this input can be found in appendix 8. Remark that the stencils which are associated with the degrees of freedom are the same for $u_x$, $u_y$ and $u_z$, but differ from the stencils obtained with the output for optimize=0. The optimization has reduced the number of degrees of freedom from 17 to 10.

A Simulation Method Using Discretizations Obtained by the Computer Program with the Input gridmin=−2, gridmax=2, se1=1, se2=0, se3=0, order=4, optimize=0, check=0

A simulation method in three dimensions which uses the program described in the appendices 1-5, wherein the approximation $D_p^A$ is obtained from the output of the program generate-discretizations which is given in appendices 1-5 using the input parameters 1. gridmin=−2, gridmax=2,
2. se1=1, se2=0, se3=0,
3. order=4, optimize=0, check=0.

A part of the output obtained with this input can be found in appendix 9. Since the stencils which are associated with the degrees of freedom are the same for $u_x$, $u_y$ and $u_z$, only those for $u_x$ are listed. The cuts are indicated in the output.

A Simulation Method Using Discretizations Obtained by the Computer Program with the Input gridmin=−2, gridmax=2, se1=1, se2=0, se3=0, order=4, optimize=1, check=0

A simulation method in three dimensions which uses the program described in the appendices 1-5, wherein the approximation $D_p^A$ is obtained from the output of the program generate-discretizations which is given in appendices 1-5 using the input parameters 1. gridmin=−2, gridmax=2,
2. se1=1, se2=0, se3=0,
3. order=4, optimize=1, check=0.

A part of the output obtained with this input can be found in appendix 10. The 90 stencils which are associated with the degrees of freedom are the same for optimize=0 and are omitted. The six conditions would take too much space to print, so just the beginning of the conditions is shown.

A Simulation Method Using Discretizations Obtained by the Computer Program with the Input gridmin=−2, gridmax=2, se1=1, se2=0, se3=0, order=4, optimize=2, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−2, gridmax=2,
2. se1=1, se2=0, se3=0,
3. order=4, optimize=2, check=0.

A part of the output obtained with this input can be found in appendix 11. Since the stencils which are associated with the degrees of freedom are the same for $u_x$, $u_y$ and $u_z$, only those for $u_x$ are listed. The cuts are indicated in the output. We have now 72 degrees of freedom for each grid-based derivative in the basis of stencils.

Given the enormous amount of output for larger stencils, we omit from now on to give the output.

A Simulation Method Using Discretizations Obtained by the Computer Program with the Input gridmin=−2, gridmax=2, se1=1, se2=0, se3=0, order=3, optimize=0, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−2, gridmax=2,
2. se1=1, se2=0, se3=0,
3. order=3, optimize=0, check=0.

There are now 105 degrees of freedom for each grid-based derivative in the basis of stencils.

A Simulation Method Using Discretizations Obtained by the Computer Program with the Input gridmin=−2, gridmax=2, se1=1, se2=0, se3=0, order=3, optimize=1, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−2, gridmax=2,
2. se1=1, se2=0, se3=0,
3. order=3, optimize=1, check=0.

A Simulation Method Using Discretizations Obtained by the Computer Program with the Input gridmin=−2, gridmax=2, se1=1, se2=0, se3=0, order=3, optimize=2, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−2, gridmax=2,
2. se1=1, se2=0, se3=0,
3. order=3, optimize=2, check=0.

There are now 92 degrees of freedom for each grid-based derivative in the basis of stencils.

A Simulation Method Using Discretizations Obtained by the Computer Program with the Input gridmin=−3, gridmax=3, se1=1, se2=0, se3=0, order=6, optimize=0, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−3, gridmax=3,
2. se1=1, se2=0, se3=0,
3. order=6, optimize=0, check=0.

There are now 259 degrees of freedom for each grid-based derivative in the basis of stencils.

A Simulation Method Using Discretizations Obtained by the Computer Program with the Input gridmin=−3, gridmax=3, se1=1, se2=0, se3=0, order=6, optimize=1, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−3, gridmax=3,
2. se1=1, se2=0, se3=0,
3. order=6, optimize=1, check=0.

A Simulation Method Using Discretizations Obtained by the Computer Program with the Input gridmin=−3, gridmax=3, se1=1, se2=0, se3=0, order=6, optimize=2, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−3, gridmax=3,
2. se1=1, se2=0, se3=0,
3. order=6, optimize=2, check=0.

A Simulation Method Using Discretizations Obtained by the Computer Program with the Input gridmin=−3, gridmax=3, se1=1, se2=0, se3=0, order=5, optimize=0, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−3, gridmax=3,
2. se1=1, se2=0, se3=0,
3. order=5, optimize=0, check=0.

There are now 287 degrees of freedom for each grid-based derivative in the basis of stencils.

A Simulation Method Using Discretizations Obtained by the Computer Program with the Input gridmin=−3, gridmax=3, se1=1, se2=0, se3=0, order=5, optimize=1, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−3, gridmax=3,
2. se1=1, se2=0, se3=0,
3. order=5, optimize=1, check=0.

A Simulation Method Using Discretizations Obtained by the Computer Program with the Input gridmin=−3, gridmax=3, se1=1, se2=0, se3=0, order=5, optimize=2, check=0

A simulation method in three dimensions which uses the program described in the appendices 1-5, wherein the approximation $D_p^A$ is obtained from the output of the program generate-discretizations which is given in appendices 1-5 using the input parameters
1. gridmin=−3, gridmax=3,
2. se1=1, se2=0, se3=0,
3. order=5, optimize=2, check=0.

A Simulation Method Using Discretizations Obtained by the Computer Program with the Input gridmin=−1, gridmax=1, se1=2, se2=0, se3=0, order=2, optimize=0, check=0

A simulation method in three dimensions which uses the program described in the appendices 1-5, wherein the approximation $D_p^A$ is obtained from the output of the program generate-discretizations which is given in appendices 1-5 using the input parameters 1. gridmin=−1, gridmax=1,
2. se1=2, se2=0, se3=0,
3. order=2, optimize=0, check=0.

The output of the program with the above input parameters is given in appendix 12.

A Simulation Method Using Discretizations Obtained by the Computer Program with the Input gridmin=−1, gridmax=1, se1=2, se2=0, se3=0, order=2, optimize=2, check=0

A simulation method in three dimensions which uses the program described in the appendices 1-5, wherein the approximation $D_p^A$ is obtained from the output of the program generate-discretizations which is given in appendices 1-5 using the input parameters 1. gridmin=−1, gridmax=1,
2. se1=2, se2=0, se3=0,
3. order=2, optimize=2, check=0.

A Simulation Method Using a Second Order Directional Discretization for the Second Derivative in Three Dimensions.

A simulation method which provides a simulated numerical representation which uses a second order directional discretization in three dimensions for the second derivative $D_2 = \partial^2 u / \partial e_1^2$, which is expressed in the terms $u_{xx}$, $u_{yy}$, $u_{zz}$, $u_{xy}$, $u_{yz}$ and $u_{zx}$ which are given by $$(u_{xx})_{i,j,k} = \frac{1}{(\Delta x)^2}(u_{i+1,j,k} - 2u_{i,j,k} + u_{i-1,j,k} + Txx), \quad (20)$$

$$(u_{yy})_{i,j,k} = \frac{1}{(\Delta y)^2}(u_{i,j+1,k} - 2u_{i,j,k} + u_{i,j-1,k} + Tyy),$$

$$(u_{zz})_{i,j,k} = \frac{1}{(\Delta z)^2}(u_{i,j,k+1} - 2u_{i,j,k} + u_{i,j,k-1} + Tzz),$$

$$(u_{xy})_{i,j,k} = \frac{1}{\Delta x \Delta y}\left\{\frac{1}{2}(u_{i+1,j+1,k} - u_{i,j+1,k} - u_{i+1,j,k} + 2u_{i,j,k} - u_{i-1,j,k} - u_{i,j-1,k} + u_{i-1,j-1,k}) + Txy\right\},$$

$$(u_{yz})_{i,j,k} = \frac{1}{\Delta y \Delta z}\left\{\frac{1}{4}(u_{i+1,j+1,k+1} - u_{i+1,j,k+1} - u_{i+1,j+1,k} + u_{i+1,j,k} + u_{i,j+1,k+1} - u_{i,j+1,k+1} - u_{i,j+1,k} + 2u_{i,j,k} - u_{i,j-1,k+1} - u_{i,j,k-1} + u_{i,j-1,k-1} + u_{i-1,j-1,k-1} - u_{i-1,j-1,k} - u_{i,j,k-1-1,k} + u_{i-1,j,k}) + Tyz\right\},$$

$$(u_{zx})_{i,j,k} = \frac{1}{\Delta z \Delta x}\left\{\frac{1}{4}(u_{i+1,j+1,k+1} - u_{i,j+1,k+1} - u_{i+1,j+1,k} + u_{i,j+1,k} + u_{i+1,j,k+1} - u_{i+1,j,k} - u_{i,j,k+1} + 2u_{i,j,k} - u_{i-1,j,k} - u_{i,j,k-1} + u_{i-1,j,k-1} + u_{i-1,j-1,k-1} - u_{i-1,j-1,k-1} - u_{i,j-1,k-1} + u_{i,j-1,k}) + Tzx\right\},$$

wherein the terms Txx, Txy, Txz, Tyy, Tyz and Tzz represent the degrees of freedom which are used in the optimization of said approximated value $D_2A$, and where indices (i, j, k) define the point of computation P on the three-dimensional grid, and $\Delta x$, $\Delta y$, $\Delta z$ denote the mesh spacings of the three-dimensional grid in each coordinate direction.

The second derivative $$D_2 = \frac{\partial^2 u}{\partial e_1^2}$$

can be expressed in the grid-based derivatives $u_{xx}$, $u_{yy}$, $u_{zz}$, $u_{xy}$, $u_{yz}$ and $u_{zx}$ according to $$\frac{\partial^2 u}{\partial e_1^2} = \cos^2\alpha\cos^2\beta\frac{\partial^2 u}{\partial x^2} + \sin^2\alpha\cos^2\beta\frac{\partial^2 u}{\partial y^2} + \quad (21)$$

$$\sin^2\beta\frac{\partial^2 u}{\partial z^2} + 2\cos\alpha\cos^2\beta\sin\alpha\frac{\partial^2 u}{\partial x \partial y} +$$

$$2\cos\alpha\cos\beta\sin\beta\frac{\partial^2 u}{\partial x \partial z} + 2\sin\alpha\cos\beta\sin\beta\frac{\partial^2 u}{\partial y \partial z}.$$

The terms $T_{xx}$, $T_{xy}$, $T_{xz}$, $T_{yy}$, $T_{yz}$ and $T_{zz}$ are obtained by the computer program mentioned before, and are given in appendix 12. The stencils $T_{xx}$, $T_{xy}$, $T_{xz}$, $T_{yy}$, $T_{yz}$ and $T_{zz}$ have been added in various quantities to the stencils $Tf_{xx}$, $Tf_{xy}$, $Tf_{xz}$, $Tf_{yy}$, $Tf_{yz}$ and $Tf_{zz}$ to obtain the more symmetric representation of equation 20. This shows once more the use of the degrees of freedom, and the equivalence between two expressions for an approximation of $D_p$ using a different $Tf$ but sharing the basis described by the stencils.

A Simulation Method Using the Second Order Directional Central Discretization for the First Derivative in the Finite Element Formulation.

A second order directional central discretization in 3 dimensions on a structured grid, for the approximation of the $D_1$ derivative $D_1 = \partial u/\partial e_1$ with a reduced error when the preferential direction $\vec{a}$ is directed along certain diagonals of the grid, is constructed as follows.

Figure 19:
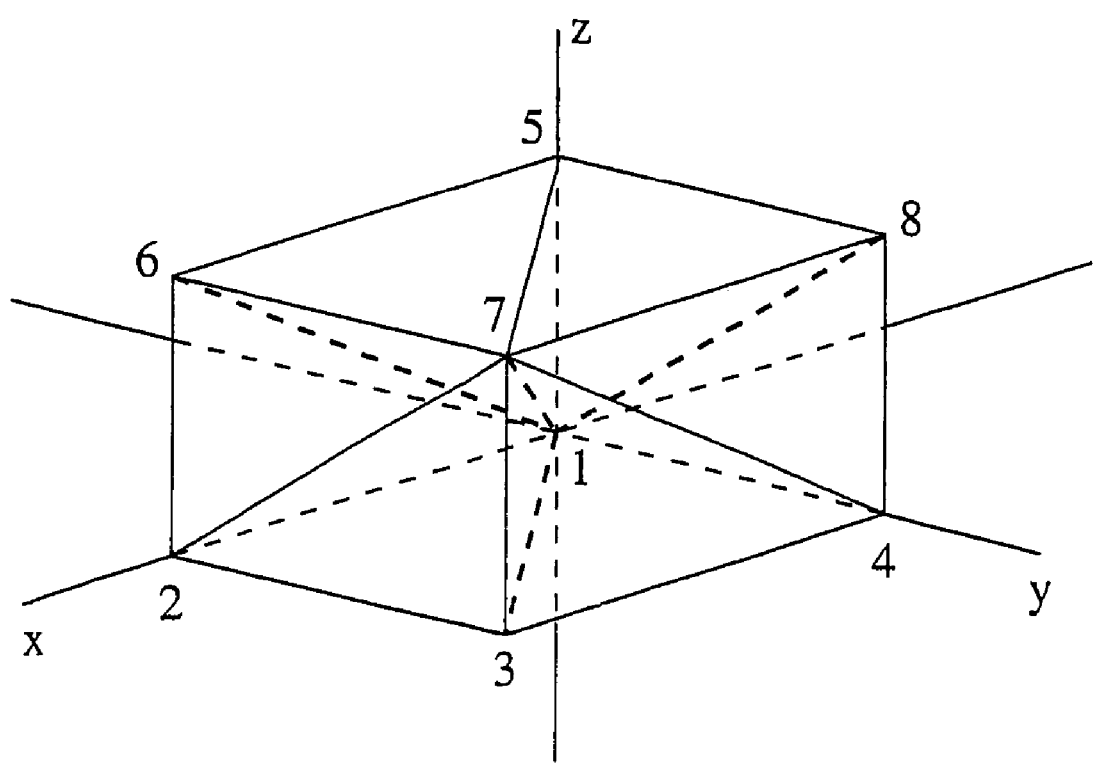
FIG. 19: Perspective view of the subdivision of a unit cube in six tetrahedra.

For the division of space in elements, we use the subdivision of a cube in tetrahedra, as indicated in FIG. 19. This subdivision holds for all the cubes of the part of space under consideration. The element for point P is defined as the conjunction of all tetrahedra meeting in P. For the basis functions φ the standard linear basis functions for tetrahedra, as described in D1, are taken. The weighting function ψ is defined as: ψ=0 over the entire element, except for the tetrahedra A and B, where ψ=3. Tetrahedron A is defined in the cube where P is situated at vertex 1 as the tetrahedron formed by the vertices 1, 2, 3 and 7. Tetrahedron B is defined in the cube where P is situated at vertex 7 as the tetrahedron formed by the vertices 7, 8, 5 and 1 (see FIG. 19).

The resulting discretization is the second order directional central discretization for the first derivative.

With different elements, basis functions and test functions, other directional discretizations can be formed, as anyone skilled in numerical methods is able to verify.

A Simulation Method Using Combined Discretizations.

Some discretizations are commonly expressed as a sum of separate discretizations. An example is the combination of the second order central discretization and an upwind discretization, $$(u_x)_{i,j,k,\ldots} = \frac{1}{2\Delta x}(u_{i+1,j,k,\ldots} - u_{i-1,j,k,\ldots}) - \quad (22)$$

$$\frac{1}{6\Delta x}(u_{i+1,j,k,\ldots} - 3u_{i,j,k,\ldots} + 3u_{i-1,j,k,\ldots} - u_{i-2,j,k,\ldots}),$$

-continued $$(u_y)_{i,j,k,\ldots} = \frac{1}{2\Delta y}(u_{i+1,j+1,k,\ldots} - u_{i+1,j,k,\ldots} + u_{i-1,j,k,\ldots} - u_{i-1,j-1,k,\ldots}) +$$

$$\frac{1}{6\Delta y}(-u_{i-2,j-2,k,\ldots} + u_{i-2,j,k,\ldots} + 3u_{i-1,j-1,k,\ldots} -$$

$$3u_{i-1,j,k,\ldots} - u_{i+1,j+1,k,\ldots} + u_{i+1,j,k,\ldots}),$$

$$(u_z)_{i,j,k,\ldots} = \frac{1}{2\Delta z}(u_{i+1,j+1,k+1,\ldots} - u_{i+1,j+1,k,\ldots} +$$

$$u_{i-1,j-1,k,\ldots} - u_{i-1,j-1,k-1,\ldots}) +$$

$$\frac{1}{6\Delta z}(-u_{i-2,j-2,k-2,\ldots} + u_{i-2,j-2,k,\ldots} + 3u_{i-1,j-1,k-1,\ldots} -$$

$$3u_{i-1,j-1,k,\ldots} - u_{i+1,j+1,k+1,\ldots} + u_{i+1,j+1,k,\ldots}),$$

$$\vdots$$

where for simplicity of notation the terms Tx, Ty, Tz, . . . are omitted.

It will be clear that combined discretizations have their directional counterparts, which for the first derivatives in the most general case are obtained with equation 8. In this respect, the invention thus concerns a method wherein $D^A = \Sigma_n L_n D_{p,n}^A$ where $L_n$ are constants and each $D_{p,n}^A$ is a function of value us of the parameter in a collection of grid points, called stencil $S_n$, with individual computational functions, which depend on the numerical framework in which $D_{p,n}^A$ is expressed. In the approximation $D_{p,n}^A$, the computational functions are chosen in such a way that the approximated value $D_{p,n}^A$ is optimized for the preferential direction.

A Simulation Method Using Combined Discretizations with Limiters.

A special case of combined schemes is the use of limiting functions, called limiters, which are at present a common practice. These limiters are used to change locally the discretization, by using a blending function between a higher-order discretization, and a low-order one, typically a first order scheme. The purpose is to obtain a discretization which does not violate a monotonicity principle.

Limiting functions can be applied to schemes using directional discretizations, thereby blending different directional discretizations.

In this respect, the invention thus concerns a method wherein $D_p^A = \Sigma_n L_n D_{p,n}^A$ where $L_n$ are limiting functions of the values us of the stencil S, and at least one $D_{p,n}^A$ is a function of value $u_s$ of the parameter in a collection of grid points, called stencil $S_n$, with individual computational functions, which depend on the numerical framework in which $D_{p,n}^A$ is expressed. In the approximation $D_{p,n}^A$, the computational functions are chosen in such a way that the approximated value $D_{p,n}^A$ is optimized for the preferential direction.

A Simulation Method Using Upwind and Central Combined Discretizations.

Another general way to view combined discretizations is to consider the class of combinations which are chosen from the group of: upwind discretizations, centered discretizations, or discretizations which are a combination of at least one upwind discretization and at least one centered discretization.

A Simulation Method Using Nonlinear Discretizations.

Most of the physical phenomena which are encountered in real world applications are non-linear. An example is the non-linear advection equation $$u_t + \vec{\nabla} \cdot \vec{f} = 0, \tag{23}$$

where the flux $\vec{f}(u)$ is a non-linear function of u in N dimensions. However, a local advection speed can be defined in many ways, e.g for the $k^{th}$ component of $\vec{a}$, $a_k = \partial f_k/\partial u$, or a such that $\vec{\nabla} \cdot \vec{f} = \vec{a} \cdot \vec{\nabla} u$. Various options are available for the discretization of equation 23, either by using directly a space discretization of $\vec{f}$ where the stencil depends on $\vec{a}$, or by linearizing the equation in one form or another, leading to a space derivative of u. Various examples can be found in the books of Hirsch (D1). In any case, the directional discretizations can be used for any of the space derivatives, in order to reduce the discretization error and to simulate any space derivative of u according to the invention.

A Simulation Method with Numerical Schemes Using Several Discretizations.

One step further then just combining discretizations in a joint discretization, is the use of different discretizations in a numerical scheme. A good example is the Lax-Wendroff scheme, see (D6) P. D. Lax and B. Wendroff, "Systems of conservation laws", Comm. Pure and Appl. Math., 13 (1960), pp. 217-317. This numerical scheme is based on a Taylor development in time for the unknown at point of computation P, $$u^{n+1} = u^n + \Delta t u_t + \frac{1}{2}\Delta t^2 u_{tt} + \cdots \tag{24}$$

When the Lax-Wendroff scheme is used to simulate the solution of an N-dimensional advection equation, $$u_t + \vec{a} \cdot \vec{\nabla} u = 0, \tag{25}$$

the partial derivatives with respect on time in equation 24 can be rewritten in space derivatives. A simplification can be immediately applied, since $\vec{a} \cdot \vec{\nabla} u = a_{e_1} u_{e_1} = a_{e_1} \partial u/\partial e_1$, that is the first derivative along $\vec{e}_1$ with velocity $a_{e_1}$. When the Taylor series is truncated after the second term, the resulting scheme is $$u^{n+1} = u^n - a_{e_1} \Delta t u_{e_1} + \frac{1}{2}(a_{e_1} \Delta t)^2 u_{e_1 e_1}. \tag{26}$$

The space derivatives can again be approximated by the directional discretizations. The first derivative is commonly discretized with a central discretization. For this we can use equation 12, or any other convenient directional discretization. The higher order terms can also be taken care of with directional discretizations.

Other schemes are the Lax-Friedrich scheme, and the scheme of Beam and Warming, which contain discretizations for which the invention is particularly appropriate.

The above examples have in common that a combination of various terms is used for certain numerical purposes, of which the enhancement of stability and the improvement of accuracy are the most common and important ones. This involves additional derivatives, each of which can be approximated by a directional discretization. The list of those schemes is long, and contains among others the Lax-Wendroff scheme, the Lax-Friedrich scheme, the Mac-Cormack scheme, the leap-frog scheme, the Crank-Nicholson scheme, the Stone-Brian scheme, the box scheme, Henn's scheme, the QUICK scheme, the k scheme, the Flux Corrected Transport (FTC) scheme, the family of ENO schemes, schemes in the class of the Piecewise Parabolic Method (PPM), multi-level schemes, schemes obtained with the fractional step method, and so on and so forth. It is to be understood that variations of these schemes which are related to the above schemes are included. The invention applies in general to every of the available schemes. An extended survey of numerical schemes can be found in the current literature as covered by the journals cited before, or in reference works like e.g D1, and references therein.

The purpose of the directional discretizations is the use in numerical schemes for the simulation of physical processes. The above schemes are some examples, but the application of the directional discretizations is not limited to those.

A Simulation Method Using Compact Discretizations.

Among the numerical discretizations striving for accuracy is the class of compact discretizations. Compact discretizations generally store on the grid not only the variables u, but also first and higher derivatives of u, which are considered as independent variables. This leads to discretizations which cover a very compact stencil. However, the derivatives appearing in this formulation still profit from a directional approach, and the discretizations mentioned above can be applied to compact discretizations.

This is an example of a numerical discretization where the invention can be applied to at least one $p^{th}$ discretization.

A Simulation Method for the Discretization of Systems of Equations.

Many physical phenomena concern interrelated parameters. An example is the flow of a gas, which involves the coupled development of, among other, energy, density and velocity. Such processes are described by coupled systems of equations, where the mathematical description contains space derivatives, and where the description is completed by one or more equations of state. The discretization of systems of equations is well-developed, and the directional discretizations of the invention offer advantages for problems modeled by systems of equations such as the Navier-Stokes equations, the Euler equations, the shallow water equations, magneto-hydrodynamic equations and so on. For a description of the application of discretizations to systems of equations, see the paper D2 or the books D1, which also include a description of the hierarchy of equations.

Application to the Navier-Stokes Equations.

A major application of the use of numerical tools is in the simulation of physical phenomena which can be modeled, at least in part, by the Navier-Stokes equations. Closure of the equations is obtained by the use of equations(s) of state which depend on the physics considered. The Navier-Stokes equations are fundamental equations in industrial applications, such as flow simulations for vehicles, turbines, oil flow (including multiphase phenomena for oil recovery), . . . , and they take a central position in the books D1. These equations are characterized by the fact that they form a coupled system of equations, which contain non-linear terms, both a first derivative and a second derivative. When the Navier-Stokes equations are simplified, other systems of equations result, which are special instants of the Navier-Stokes equations. Examples are the Euler equations, thin-layer approximations, incompressible Navier-Stokes equations and so on.

Application to the Euler Equations.

A major application of numerical tools is the simulation of physical phenomena which can be modeled, at least in part, by the Euler equations. This is a special case of the Navier-Stokes equations, and the equations are characterized by the fact that they form a coupled system of equations, which contain non-linear terms, and only first derivatives.

Application to the Magneto-hydrodynamic Equations.

Another major application of numerical tools is the simulation of physical phenomena which can be described by the coupling of the hydrodynamic equations with the electromagnetic equations. The directional discretizations of this invention are very well suited for application to equations with the combination of these characteristics.

Combinations of Models.

Commonly, physical phenomena involve many parts of physics, such as fluid mechanics possibly involving multiple phases, electromagnetism, chemical reactions, stress analysis, heat transfer and so on. An example is the design and optimizations of a wing in a flow, taking into account the flexibility of the wing. Such combinations of physical phenomena are commonly described by the term multi-physics. The mathematical description of such combined physical phenomena involves therefore multiple sets of equations, among which equations which model turbulence, chemical reactions, electromagnetic phenomena, multiphase flow and multi-physics phenomena.

Directional Discretizations Combined with Acceleration Techniques.

The solution of the discrete equations can be accelerated by a number of well-known techniques, see e.g. the books D1. Among them are local time-stepping, preconditioning, multi-grid and GMRES. The directional discretizations of this invention are very well suited for application to discretizations with the combination of acceleration techniques.

Simulation of Flow.

In the beginning of this description, the aim of the invention was stated as aiming at improving the numerical tool for the design and the optimization of commercial products, thereby reducing the computational cost of numerical simulations and the time of the design-cycle. A major application concerns the simulation of physical phenomena which include flow.

Simulation of an Object in Flow.

Numerical simulations are a valuable tool in the design and optimization of objects which are exposed to a flow. In particular, the invention aims to be used for obtaining a simulated numerical representation of a material object interacting with material flow.

Simulation of a Vehicle.

A particular case is the design and optimization of vehicles which are moving in a flow.

Vehicles can be used at all kind of velocities in all kind of flows. Examples are spacecraft in rarefied flow at hypersonic speeds, supersonic, transonic and subsonic aircraft, vehicles moving on land from racing cars to low-speed energy saving designs, underwater vehicles like submarines, multiphase vehicles like boats, and so on and so forth. In particular, the invention aims to be used for obtaining a simulated numerical representation including a vehicle.

Simulation of Rotating Blades.

A particular case is the design and optimization of turbomachines. They are member of the class of machines which contain a rotating part exposed to flow. This class includes also propellers as found on aircraft and ships, wind mills, ventilators, air conditioning systems, and so on. In particular, the invention aims to be used for obtaining a simulated numerical representation including a rotating blade.

Simulation of Atmospheric Flow.

A particular case of flow is the flow of the atmosphere. Simulation of this flow is at the basis of weather prediction.

In particular, the invention aims to be used for obtaining a simulated numerical representation of the atmosphere.

Simulation of Oil Recovery.

A special case of multi-phase flow is the field of oil recovery, where oil is extracted by the use of a different fluid such as water or steam. In particular, the invention aims to be used for obtaining a simulated numerical representation applied to oil recovery.

Simulation of Combustion.

A special case of multi-phase flow is combustion. This can be free combustion such as in forest fire, or internal combustion such as in an engine. In particular, the invention aims to be used for obtaining a simulated numerical representation of combustion.

Simulation Using a Computer

The tool of preference for numerical simulations is a computer. In particular, the invention aims to be used in a data processing system programmed to implement a simulation method according to the invention, so as to provide a simulated representation of said phenomenon from a data set of initial values of each of said parameter(s) U.

Simulation Computer Program.

A computer needs a computer program to execute the simulation. In particular, the invention aims to be used in a computer program that can be loaded in a data processing system so as to implement a method according to the invention, and to provide a simulated representation of said phenomenon from a data set of initial values of each of said parameter(s) U.

Simulation Stored On a Medium.

A computer program according to the invention needs to be stored. In particular, the invention aims to be used in a digital storage computer-readable medium containing a stored computer program that is configured to be loadable in a data processing system so as to implement a method according to the invention, and to provide a simulated representation of said phenomenon from a data set of initial values of each of said parameter(s) U.

Applications in the Framework of Established Numerical Methods.

The methods of numerical simulations are well-developed, see e.g. D1. The invention fits smoothly into this framework, since it touches the core, namely the discretization of space derivatives, but without touching the established methods like acceleration techniques, preconditioners, grid adaptation and so on. It is to be understood that the invention applies to the entire established collected wisdom in the field of numerical simulations.

Although the invention is presented in its elementary form, any person competent in numerical methods can extend the presented discretizations for use on any type of grid including grids in polar, spherical or any type of coordinates, in non-linear applications, re-formulation in any of the formulations such as Finite Element, Finite Volume, or distribution formulations such as Residual Distribution or Flux Vector Distribution or any other formulation, derive the discretization for any directional first or higher derivative of any order, and any combination of the discretizations of the present invention in any numerical scheme like the Lax-Wendroff type of schemes, compact schemes of any type, and application to systems of equations.

The principle of the invention has been described. It will be clear to the experienced in numerical methods that various changes may be made to the embodiments described above without departing from the spirit and scope of this invention as described in the following claims. It is, therefore, to be understood that this invention is not limited to the specific details shown and described.

List of Symbols

A an amplitude of a Fourier component

A', A'' intermediate bases in the transformation from the grid basis to the local basis B a, b, c, . . . components of the vector $\vec{a}$ $\vec{a}$ vector of preferential direction $B(\vec{e}_1, \vec{e}_2, \vec{e}_3 \ldots)$ a local basis, with $\vec{e}_1$ along a preferential direction i.e. $\vec{e}_1 // \vec{a}$ $C_c$ computational coefficients used in the approximation of $D_p^A$, which are dependent on the numerical formulation used $C_s$ computational coefficients used in the approximation of $D_p^A$, in the Finite Difference formulation; weighting coefficients $C_{l,m,n}, \ldots$ the weighting coefficients $C_s$ for node l, m, n, . . .

$D_p$ spatial $p^{th}$ derivative, to be discretized $D_p^A$ an approximation to $D_p$ $D_p^{LC}$ an approximation to $D_p$ in the Finite Difference formulation, representing a linear combination of values $D_p^{\alpha_i}$ an approximation to $D_p$ in a Distribution Method, depending on the distribution coefficients $\alpha_i$ $D_p^{\phi,\psi}$ an approximation to $D_p$ in the Finite Element formulation depending on the basis function $\phi$ and the test function $\psi$ $f$ the flux I the imaginary unit, such that $I^2 = -1$ i, j, k, . . . indices numbering the nodes of a structured grid $i_{max}, j_{max}, k_{max}, \ldots$ maximum indices of a grid $I_{el}$ the integral of the derivative $D_p$ over a volume, used in the Residual Distribution Method M order of the error of a discretization N number of dimensions P the point where the derivative is computed p index for a higher ($p^{th}$) derivative, or first derivative (p=1)

$p_1, p_2, p_3, \ldots$ the powers of the derivatives with respect to $\vec{e}_1, \vec{e}_2, \ldots$ in a mixed derivative $q_1, q_2, q_3, \ldots$ arbitrary variables r an integer summation index $r_{max}$ the maximum value of r in the summation S the stencil: the set of points used in the computation of the approximation $D_p^A$ t the time coordinate $t_{11}, t_{12}, \ldots$ coefficients used in the transformation between coordinate systems $T_\beta$ represent the terms in the discretization $\beta$ resulting from degrees of freedom which remain when the approximated value $D_p^A$ is optimized u unknown at a grid point $u_S$ unknown at a point of the stencil S $u_\alpha$ derivative of u with respect to $\alpha$, e.g.

$$u_\alpha = \frac{\partial u}{\partial \alpha}$$

$\vec{x}$ N-dimensional position vector $\vec{\nabla}$ differential operator, $$\left(\frac{\partial}{\partial x}, \frac{\partial}{\partial y}, \frac{\partial}{\partial z}, \ldots\right)^T$$

$\alpha_i$ the distribution coefficient used in the Distribution Method for the distribution of the part $\alpha_i I_{el}$ or $\alpha_i f$ to node i $\Delta x, \Delta y, \Delta z, \ldots$ the mesh spacings in the coordinate directions $\Delta t$ the time increment $$\frac{\partial u}{\partial x}$$

partial $p^{th}$ derivative of u with respect to x $$\frac{\partial^p}{\partial x^p}$$

derivative with respect to x $\epsilon_n$ error term in $D_p^A$ $\epsilon_S$ error term in the expression of $u_S$ using a truncated Taylor series expansion $\vec{\kappa}$ the wave number vector $\phi$ the basis function used in the Finite Element method for representing u over the element $\psi$ test function used in the integrals of the derivative in the Finite Element formulation $\omega$ the angular frequency

What is claimed is:

1. A computation method for simulating behavior of a flow interacting with an object, comprising the steps of:
developing a simulated numerical representation in N dimensions, $N \geq 3$, composed of a plurality of approximated values at a multitude of points in at least a part of space where a flow interacts with an object, the approximated values being of a physical parameter u of the flow to which is associated a velocity field $\vec{a}$ which determines a preferential direction by executing a numerical scheme wherein at least one spatial $p^{th}$ derivative $D_p$, $p \geq 1$, of the parameter u is approximated at the points of the part of space, through the steps of
i) constructing a discrete N-dimensional grid constructed by N families of coordinate lines and using the constructed grid for the part of space,
ii) computing, in at least one point P of the grid, called the point of computation, an approximated value of $D_p^A$ of $D_p$ with an error $\epsilon_n$, by using values $u_S$ of the parameter in a collection of grid points, called the stencil S, and computational functions, evaluated with the values $u_S$, the computational functions depending on the numerical framework in which $D_p$ is expressed, and
iii) choosing the computational functions for the approximated value $D_p^A$ in such a way that the approximated value $D_p^A$ is optimized for the preferential direction, wherein the stencil S contains at least one point situated outside all the coordinate lines passing through the point of computation P, and the stencil S contains at least a first point and a second point, the first point being defined by N first coordinate lines of the N families of lines, the second point being defined by N second coordinate lines of the N families of lines, and for at least one family $N_f$ of the coordinate lines, the first coordinate line belonging to the family $N_f$ is different from and not adjacent to the second coordinate line belonging to the same family $N_f$;
outputting the simulated numerical representation that simulates, for the part of space, the behavior of the flow interacting with the object; and
determining the behavior of the flow interacting with the object by using the output simulated numerical representation.

2. The method of claim 1, wherein for varying preferential directions, the approximation $D_p^A$ depends continuously on the values $u_S$.

3. The method of claim 1, wherein the computing step of $D_p^A$ comprises the steps of:
providing a local basis $B(\vec{e}_1, \vec{e}_2, \vec{e}_3, \ldots)$ of curvilinear coordinates which has the unit vector $\vec{e}_1$ along the preferential direction, and
choosing the computational functions so that a contribution to the error $\epsilon_n$ of at least one pure or one mixed derivative as expressed in the local basis B is minimized, while using as a formulation of the values $u_S$ of the parameter at each of the points of the stencil S, a truncated Taylor series expansion with respect to the point of computation P with an error, called the truncation error $\epsilon_S$.

4. The method of claim 3, wherein the computational functions are individual coefficients $C_S$ and the approximated value $D_p^A$ is a linear combination of values $u_S$ of the parameter.

5. The method of claim 3, wherein the computing step of $D_p^A$ comprises the steps of:
using an integral formulation for the computation of the derivative $D_p$ with computational functions which are fluxes through a control volume,
computing in at least one volume an approximated value $D_p^A$ of $D_p$ with an error $\epsilon_n$, where the approximated value is a function of the flux formulation employed.

6. The method of claim 3, wherein the computing step of $D_p^A$ comprises the steps of:
subdividing the part of space into elements, containing nodes at which the approximation of the physical parameter u is stored,
defining basis computational functions $\phi$, called interpolation functions, on the elements, where the interpolation functions are used to approximate the physical value u on the element,
computing the integral of the derivative $D_p$ on the element, using a test computational function $\psi$, called weighting function,
computing in at least one element an approximated value $D_p^{\phi,\psi}$ of $D_p$ with an error $\epsilon_n$ where the approximated value is a function of the interpolation functions $\phi$ and the weighting function $\psi$.

7. The method of claim 3, wherein the computing step of $D_p^A$ comprises the steps of:
subdividing the part of space into elements, containing nodes at which the approximation of the physical parameter u is stored,
defining basis computational functions $\phi$, called interpolation functions, on the elements, where the interpolation functions are used to approximate the physical value u on the element, computing the integral $I_{el}$ of the derivative $D_p$ on volumes, and distributing parts $\alpha_i I_{el}$ to nodes i, where $\alpha_i$ represent computational functions called distribution coefficients.

8. The method of claim 3, wherein the computing step of $D_p^A$ comprises the steps of:
   subdividing the part of space into elements, containing nodes at which the approximation of the physical parameter u is stored,
   defining basis computational functions $\phi$, called interpolation functions, on the elements, where the interpolation functions are used to approximate the physical value u on the element,
   computing fluxes $f$ at the surfaces of volumes, and distributing parts $\alpha_i f$ to nodes i, where $\alpha_i$ represent computational functions called distribution coefficients.

9. The method of claim 1, wherein the computing step of $D_p^A$ comprises the steps of:
   using a representation of the numerical solutions in Fourier components, and
   choosing in the approximated value $D_p^A$ the computational functions in such a way that the Fourier components are optimized for certain directions which are related to the velocity $\vec{a}$, while using the values $u_S$ of the parameter at each of the points of the stencil S in the Fourier representation.

10. The method of claim 9, wherein the computational functions are individual coefficients $C_S$ and the approximated value $D_p^A$ is a linear combination of values $u_S$ of the parameter.

11. The method of claim 9, wherein the computing step of $D_p^A$ comprises the steps of:
    using an integral formulation for the computation of the derivative $D_p$ with computational functions which are fluxes through a control volume,
    computing in at least one volume an approximated value $D_p^A$ of $D_p$ with an error $\epsilon_n$, where the approximated value is a function of the flux formulation employed.

12. The method of claim 9, wherein the computing step of $D_p^A$ comprises the steps of:
    subdividing the part of space into elements, containing nodes at which the approximation of the physical parameter u is stored,
    defining basis computational functions $\phi$, called interpolation functions, on the elements, where the interpolation functions are used to approximate the physical value u on the element,
    computing the integral of the derivative $D_p$ on the element, using a test computational function $\psi$, called weighting function,
    computing in at least one element an approximated value $D_p^{\phi,\psi}$ of $D_p$ with an error $\epsilon_n$, where the approximated value is a function of the interpolation functions $\phi$ and the weighting function $\psi$.

13. The method of claim 9, wherein the computing step of $D_p^A$ comprises the steps of:
    subdividing the part of space into elements, containing nodes at which the approximation of the physical parameter u is stored,
    defining basis computational functions $\phi$, called interpolation functions, on the elements, where the interpolation functions are used to approximate the physical value u on the element,
    computing the integral $I_{el}$ of the derivative $D_p$ on volumes, and distributing parts $\alpha_i I_{el}$ to nodes i, where $\alpha_i$ represent computational functions called distribution coefficients.

14. The method of claim 9, wherein the computing step of $D_p^A$ comprises the steps of:
    subdividing the part of space into elements, containing nodes at which the approximation of the physical parameter u is stored,
    defining basis computational functions $\phi$, called interpolation functions, on the elements, where the interpolation functions are used to approximate the physical value u on the element,
    computing fluxes $f$ at the surfaces of volumes, and distributing parts $\alpha_i f$ to nodes i, where $\alpha_i$ represent computational functions called distribution coefficients.

15. The method of claim 1, wherein the N-dimensional grid is expressed in a coordinate system which is chosen from the group consisting of: rectangular coordinates, spherical coordinates, cylindrical coordinates, parabolic cylindrical coordinates, paraboloidal coordinates, elliptic cylindrical coordinates, prolate spheroidal coordinates, oblate spheroidal coordinates, bipolar coordinates, toroidal coordinates, conical coordinates, confocal ellipsoidal coordinates and confocal paraboloidal coordinates.

16. The method of claim 1, wherein the N-dimensional grid is chosen from the group consisting of: a grid with non-uniform mesh spacing, a grid which is moving, a grid which is deforming, a grid which is rotating, and a grid which is staggered, and any combination thereof.

17. The method of claim 1, wherein the spatial $p^{th}$ derivative $D_p$ is a pure derivative $$\frac{\partial^p u}{\partial e_i^p}.$$

18. The method of claim 1, wherein p=1.

19. The method of claim 1, wherein p=2.

20. The method of claim 1, wherein the spatial $p^{th}$ derivative $D_p$ is a mixed derivative $$\frac{\partial^p u}{\partial e_1^{p_1} \partial e_2^{p_2} \ldots}$$

with $p_1+p_2+\ldots=p$.

21. The method of claim 3, computing an approximated value $D_1^A$ of $D_1$, where the approximated value is denoted by $$\begin{pmatrix} (u_x)_{i,j,k,\ldots} \\ (u_y)_{i,j,k,\ldots} \\ (u_z)_{i,j,k,\ldots} \\ \vdots \end{pmatrix}, \quad (27)$$

wherein $$(u_x)_{i,j,k,\ldots} = \frac{1}{\Delta x}\{a_{-m}u_{i-m,j,k,\ldots} + a_{-m+1}u_{i-m+1,j,k,\ldots} + \ldots + \quad (28)$$
$$a_{n-1}u_{i+n-1,j,k,\ldots} + a_n u_{i+n,j,k,\ldots} + Tx\},$$

$$(u_y)_{i,j,k,\ldots} = \frac{1}{\Delta y}\{a_{-m}(u_{i-m,j-m,k,\ldots} - u_{i-m,j,k,\ldots}) +$$
$$a_{-m+1}(u_{i-m+1,j-m+1,k,\ldots} - u_{i-m+1,j,k,\ldots}) + \ldots +$$
$$a_{n-1}(u_{i+n-1,j+n-1,k,\ldots} - u_{i+n-1,j,k,\ldots}) +$$
$$a_n(u_{i+n,j+n,k,\ldots} - u_{i+n,j,k,\ldots}) + Ty\},$$

$$(u_z)_{i,j,k,\ldots} = \frac{1}{\Delta z}\{a_{-m}(u_{i-m,j-m,k-m,\ldots} - u_{i-m,j-m,k,\ldots}) +$$
$$a_{-m+1}(u_{i-m+1,j-m+1,k-m+1,\ldots} -$$
$$u_{i-m+1,j-m+1,k,\ldots}) + \ldots +$$
$$a_{n-1}(u_{i+n-1,j+n-1,k+n-1,\ldots} - u_{i+n-1,j+n-1,k,\ldots}) +$$
$$a_n(u_{i+n,j+n,k+n,\ldots} - u_{i+n,j+n,k,\ldots}) + Tz\},$$
$$\vdots$$

wherein $a_{-m}\neq 0$, $a_n \neq 0$, m and n are given integers, m+n>0, and m+n>1 if m*n=0, the terms $T_x, T_y, T_z, \ldots$ represent the degrees of freedom which are used in the optimization of the approximated value $D_1^A$, and where indices (i, j, k, . . . ) define the point of computation P on the N-dimensional grid, and $\Delta x$, $\Delta y$, $\Delta z$, . . . denote the mesh spacings of the N-dimensional grid in each coordinate direction.

22. The method of claim 21, computing an approximated value of $D_1^A$ of $$D_1 = \frac{\partial u}{\partial e_1}$$

by a discretization of order M, in which the terms $$\frac{\partial^{M+1} u}{\partial e_2^{M_2} \partial e_3^{M_3}\ldots}$$

with $M_2+M_3+\ldots = M+1$ are eliminated in the approximated value $D_1^A$.

23. The method of claim 21, computing an approximated value $D_1^A$ of $$D_1 = \frac{\partial u}{\partial e_1}$$

by a discretization of order M, in which the terms $$\frac{\partial^{M+1} u}{\partial e_1^{M_1} \partial e_2^{M_2} \partial e_3^{M_3}\ldots}$$

with $M_1+M_2+M_3+\ldots = M+1$ and $M_1 < M+1$ are eliminated in the approximated value $D_1^A$ in the case that $\vec{e}_1$ is along the x-axis or along diagonals.

24. The method of claim 1, computing an approximated value $D_1^A$ of $D_1$, where the approximated value is denoted by $$\begin{pmatrix}(u_x)_{i,j,k,\ldots} \\ (u_y)_{i,j,k,\ldots} \\ (u_z)_{i,j,k,\ldots} \\ \vdots \end{pmatrix}, \quad (29)$$

wherein $$(u_x)_{i,j,k,\ldots} = \frac{1}{\Delta x}\{a_{-m}u_{i-m,j,k,\ldots} + a_{-m+1}u_{i-m+1,j,k,\ldots} + \ldots + \quad (30)$$
$$a_{n-1}u_{i+n-1,j,k,\ldots} + a_n u_{i+n,j,k,\ldots}\},$$

$$(u_y)_{i,j,k,\ldots} = \frac{1}{\Delta y}\{a_{-m}(u_{i-m,j-m,k,\ldots} - u_{i-m,j,k,\ldots}) +$$
$$a_{-m+1}(u_{i-m+1,j-m+1,k,\ldots} - u_{i-m+1,j,k,\ldots}) + \ldots +$$
$$a_{n-1}(u_{i+n-1,j+n-1,k,\ldots} - u_{i+n-1,j,k,\ldots}) +$$
$$a_n(u_{i+n,j+n,k,\ldots} - u_{i+n,j,k,\ldots})\},$$

$$(u_z)_{i,j,k,\ldots} = \frac{1}{\Delta z}\{a_{-m}(u_{i-m,j-m,k-m,\ldots} - (u_{i-m,j-m,k,\ldots}) +$$
$$a_{-m+1}(u_{i-m+1,j-m+1,k-m+1,\ldots} - u_{i-m+1,j+1,k,\ldots}) + \ldots +$$
$$a_{n-1}(u_{i+n-1,j+n-1,k+n-1,\ldots} - u_{i+n-1,j+n-1,k,\ldots})$$
$$a_n(u_{i+n,j+n,k+n,\ldots} - u_{i+n,j+n,k,\ldots})\},$$
$$\vdots$$

wherein $a_{-m}\neq 0$, $a_n \neq 0$, m and n are given integers, m+n>0, and m+n>1 if m*n=0, and where indices (i, j, k, . . . ) define the point of computation P on the N-dimensional grid, and $\Delta x$, $\Delta y$, $\Delta z$, . . . denote the mesh spacings of the N-dimensional grid in each coordinate direction.

25. The method of claim 21, wherein $$(u_x)_{i,j,k,\ldots} = \frac{1}{\Delta x}\left\{\frac{1}{2}(u_{i+1,j,k,\ldots} - u_{i-1,j,k,\ldots}) + Tx\right\}, \quad (31)$$

$$(u_y)_{i,j,k,\ldots} = \frac{1}{\Delta y}\left\{\frac{1}{2}u_{i+1,j+1,k,\ldots} - u_{i+1,j,k,\ldots} + \right.$$
$$\left. u_{i-1,j,k,\ldots} - u_{i-1,j-1,k,\ldots}) + Ty\right\},$$

$$(u_z)_{i,j,k,\ldots} = \frac{1}{\Delta z}\left\{\frac{1}{2}(u_{i+1,j+1,k+1,\ldots} - u_{i+1,j+1,k,\ldots} + \right.$$
$$\left. u_{i-1,j-1,k,\ldots} - u_{i-1,j-1,k-1,\ldots}) + Tz\right\},$$
$$\vdots$$

26. The method of claim 21, wherein $$(u_x)_{i,j,k,\ldots} = \frac{1}{\Delta x}\left\{\frac{1}{12}(u_{i-2,j,k,\ldots} - 8u_{i-1,j,k,\ldots} + \right. \quad (32)$$
$$\left. 8u_{i+1,j,k,\ldots} - u_{i+2,j,k,\ldots}) + Tx\right\},$$

-continued $$(u_y)_{i,j,k,\ldots} = \frac{1}{\Delta y}\Big\{\frac{1}{12}(u_{i-2,j-2,k,\ldots} - u_{i-2,j,k,\ldots} -$$
$$8u_{i-1,j-1,k,\ldots} + 8u_{i-1,j,k,\ldots} +$$
$$8u_{i+1,j+1,k,\ldots} - 8u_{i+1,j,k,\ldots} -$$
$$u_{i+2,j+2,k,\ldots} + u_{i+2,j,k,\ldots}) + Ty\Big\},$$

$$(u_z)_{i,j,k,\ldots} = \frac{1}{\Delta z}\Big\{\frac{1}{12}(u_{i-2,j-2,k-2,\ldots} - u_{i-2,j-2,k,\ldots} -$$
$$8u_{i-1,j-1,k-1,\ldots} + 8u_{i-1,j-1,k,\ldots} +$$
$$8u_{i+1,j+1,k+1,\ldots} - 8u_{i+1,j+1,k,\ldots} -$$
$$u_{i+2,j+2,k+2,\ldots} + u_{i+2,j+2,k,\ldots}) + Tz\Big\},$$
$$\vdots$$

27. The method of claim 21, wherein $$(u_x)_{i,j,k,\ldots} = \frac{1}{\Delta x}\Big(\frac{3}{2}u_{i,j,k,\ldots} - 2u_{i-1,j,k,\ldots} + \frac{1}{2}u_{i-2,j,k,\ldots} + Tx\Big), \quad (33)$$

$$(u_y)_{i,j,k,\ldots} = \frac{1}{\Delta y}(-2(u_{i-1,j-1,k,\ldots} - u_{i-1,j,k,\ldots}) +$$
$$\frac{1}{2}(u_{i-2,j-2,k,\ldots} - u_{i-2,j,k,\ldots}) + Ty),$$

$$(u_z)_{i,j,k,\ldots} = \frac{1}{\Delta z}\Big(-2(u_{i-1,j-1,k-1,\ldots} - u_{i-1,j-1,k,\ldots}) +$$
$$\frac{1}{2}(u_{i-2,j-2,k-2,\ldots} - u_{i-2,j-2,k,\ldots}) + Tz\Big),$$
$$\vdots$$

28. A method according to claim 1, in three dimensions, obtaining the approximation $D_p^A$ with order M of the derivative $$D_p = \frac{\partial^p u}{\partial e_1^{p_1} \partial e_2^{p_2} \partial e_3^{p_3}}$$

with $p_1 + p_2 + p_3 = p$ on a grid of given extent from the output of a computer program.

29. A method according to claim 28, wherein in the approximation $D_p^A$ by a discretization of order M terms are eliminated, which are the terms $$\frac{\partial^{M+1} u}{\partial e_2^{M_2} \partial e_3^{M_3} \ldots}$$

with $M_2 + M_3 + \ldots = M+1$, or the terms $$\frac{\partial^{M+1} u}{\partial e_1^{M_1} \partial e_2^{M_2} \partial e_3^{M_3} \ldots}$$

with $M_1 + M_2 + M_3 + \ldots = M+1$ and $M_1 < M+1$ in the case that $\vec{e}_1$ is along the x-axis or along diagonals.

30. A method according to claim 28, wherein the approximation of $D_p^A$ is a first order accurate discretization.

31. The method of claim 3, computing in three dimensions an approximation of the second derivative $$D_2 = \frac{\partial^2 u}{\partial e_1^2},$$

where the approximation $D_2^A$ is expressed in the terms $u_{xx}$, $u_{yy}$, $u_{zz}$, $u_{xy}$, $u_{yz}$ and $u_{zx}$ which are given by $$(u_{xx})_{i,j,k} = \frac{1}{(\Delta x)^2}(u_{i+1,j,k} - 2u_{i,j,k} + u_{i-1,j,k} + Txx), \quad (34)$$

$$(u_{yy})_{i,j,k} = \frac{1}{(\Delta y)^2}(u_{i,j+1,k} - 2u_{i,j,k} + u_{i,j-1,k} + Tyy),$$

$$(u_{zz})_{i,j,k} = \frac{1}{(\Delta z)^2}(u_{i,j,k+1} - 2u_{i,j,k} + u_{i,j,k-1} + Tzz),$$

$$(u_{xy})_{i,j,k} = \frac{1}{\Delta x \Delta y}\Big\{\frac{1}{2}(u_{i+1,j+1,k} - u_{i,j+1,k} - u_{i+1,j,k} + 2u_{i,j,k} -$$
$$u_{i-1,j,k} - u_{i,j-1,k} + u_{i-1,j-1,k}) + Txy\Big\},$$

$$(u_{yz})_{i,j,k} = \frac{1}{\Delta y \Delta z}\Big\{\frac{1}{4}(u_{i+1,j+1,k+1} - u_{i+1,j,k+1} - u_{i+1,j+1,k} +$$
$$u_{i+1,j,k} + u_{i,j+1,k+1} - u_{i,j+1,k} - u_{i,j+1,k} + 2u_{i,j,k} -$$
$$u_{i,j-1,k} - u_{i,j,k-1} + u_{i,j-1,k-1} + u_{i-1,j-1,k-1} -$$
$$u_{i-1,j-1,k} - u_{i-1,j,k-1} + u_{i-1,j,k}) + Tyz\Big\},$$

$$(u_{zx})_{i,j,k} = \frac{1}{\Delta z \Delta x}\Big\{\frac{1}{4}(u_{i+1,j+1,k+1} - u_{i,j+1,k+1} - u_{i+1,j+1,k} +$$
$$u_{i,j+1,k} + u_{i+1,j,k+1} - u_{i+1,j,k} - u_{i,j,k+1} + 2u_{i,j,k} -$$
$$u_{i-1,j,k} - u_{i,j,k-1} + u_{i-1,j,k-1} + u_{i-1,j-1,k-1} -$$
$$u_{i-1,j-1,k} - u_{i,j-1,k-1} + u_{i,j-1,k}) + Tzx\Big\},$$

wherein the terms $T_{xx}$, $T_{xy}$, $T_{xz}$, $T_{yy}$, $T_{yz}$ and $T_{zz}$ represent the degrees of freedom which are used in the optimization of the approximated value $D_2^A$ and where indices (i, j, k) define the point of computation P on the three-dimensional grid, and $\Delta x$, $\Delta y$, $\Delta z$ denote the mesh spacings of the three-dimensional grid in each coordinate direction.

32. The method according to claim 1, wherein $D_p^A = \Sigma_n L_n D_{p,n}^A$ where $L_n$ are constants and each $D_{p,n}^A$ is a function of values $u_S$ of the parameter in a collection of grid points, called stencil $S_n$, with individual computation functions, which depend on the numerical framework in which $D_{p,n}^A$ is expressed, and wherein in the approximation $D_{p,n}^A$, the computation functions are chosen in such a way that the approximated value $D_{p,n}^A$ is optimized for the preferential direction.

33. The method of claim 1, wherein $D_p^A = \Sigma_n L_n D_{p,n}^A$ where $L_n$ are limiting functions of the values $u_S$ of the stencil S, and at least one $D_{p,n}^A$ is a function of values $u_S$ of the parameter in a collection of grid points, called stencil $S_n$, with individual computation functions, which depend on the numerical framework in which $D_{p,n}^A$ is expressed, and wherein in the approximation $D_{p,n}^A$, the computation functions are chosen in such a way that said approximated value $D^{p,n,A}$ is optimized for the preferential direction.

34. The method of claim 1, wherein the stencil S is chosen from the group consisting of: upwind discretization stencils, centered discretization stencils, and discretization stencils which are a combination of at least one upwind discretization stencil and at least one centered discretization stencil.

35. The method of claim 1, wherein the numerical discretization is a non-linear discretization.

36. The method of claim 1, wherein the numerical scheme is chosen from the group consisting of: the Lax-Wendroff scheme, the Lax-Friedrich scheme, the MacCormack scheme, the leap-frog scheme, the Crank-Nicholson scheme, the Stone-Brian scheme, the box scheme, Henn's scheme, the QUICK scheme, the κscheme, the Flux Corrected Transport (FTC) scheme, the family of ENO schemes, schemes in the class of the Piecewise Parabolic Method (PPM), multi-level schemes, and schemes obtained with the fractional step method and variants thereof.

37. The method of claim 1, wherein the numerical scheme includes the discretization of a plurality of equations.

38. The method of claim 1 for the numerical simulation of physical phenomena which are modeled by the Navier-Stokes equations with equation(s) of state.

39. The method of claim 1 for the numerical simulation of physical phenomena which are modeled by the Euler equations with equation(s) of state.

40. The method of claim 1 for the numerical simulation of physical phenomena which are modeled by the magneto-hydrodynamic equations with equation(s) of state.

41. The method of claim 1 in combination with at least one model for the physical phenomena chosen from the group consisting of: equations to model turbulence, equations to model chemical reactions, equations to model electromagnetic phenomena, equations to model multiphase flow and equations to model multiphysics phenomena.

42. The method of claim 1 for the numerical simulation of physical phenomena in combination with at least one acceleration technique chosen from the group consisting of: local time-stepping, multi-grid, GMRES and preconditioning.

43. The method of claim 1 for the simulation of a physical phenomenon which includes a material flow.

44. The method of claim 1 for the simulation of a physical phenomenon which includes a material object interacting with material flow.

45. The method of claim 1, wherein the object is a vehicle.

46. The method of claim 1, wherein the object includes a rotating blade.

47. The method of claim 1, wherein the object is at least a part of the atmosphere of the earth.

48. The method of claim 1, wherein the flow includes oil.

49. The method of claim 1, wherein the flow includes combustion.

50. A data processing system programmed to implement a method according to claim 1.

51. A computer program that can be loaded in a data processing system so as to implement a method according to claim 1.

52. A digital storage computer-readable medium containing a stored computer program that is configured to be loadable in a data processing system so as to control the data processing system to implement a method according to claim 1.

* * * * *